(12) United States Patent
Takahashi et al.

(10) Patent No.: US 10,108,018 B2
(45) Date of Patent: Oct. 23, 2018

(54) IMAGE DISPLAY APPARATUS FOR DISPLAYING AN IMAGE CAPTURED BY A MOBILE APPARATUS

(71) Applicant: SONY CORPORATION, Tokyo (JP)

(72) Inventors: Naomasa Takahashi, Chiba (JP); Tatsuya Narahara, Kanagawa (JP); Yoichiro Sako, Tokyo (JP); Motoyuki Takai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 14/441,138

(22) PCT Filed: Oct. 2, 2013

(86) PCT No.: PCT/JP2013/076830
§ 371 (c)(1),
(2) Date: May 6, 2015

(87) PCT Pub. No.: WO2014/077046
PCT Pub. Date: May 22, 2014

(65) Prior Publication Data
US 2015/0293362 A1    Oct. 15, 2015

(30) Foreign Application Priority Data

Nov. 13, 2012 (JP) .................................. 2012-249614

(51) Int. Cl.
*H04N 13/02* (2006.01)
*H04N 15/00* (2006.01)
(Continued)

(52) U.S. Cl.
CPC ............. *G02B 27/02* (2013.01); *G06F 3/147* (2013.01); *G09G 5/00* (2013.01); *H04N 13/239* (2018.05);
(Continued)

(58) Field of Classification Search
CPC .......... G02B 27/02; G06F 3/147; G09G 5/00; G09G 2340/0464; G09G 3/003;
(Continued)

(56) References Cited

U.S. PATENT DOCUMENTS 3,916,094 A * 10/1975 Marrone ............... G05D 1/0038
                                                        348/211.4
7,180,476 B1 * 2/2007 Guell ..................... G01S 19/15
                                                        340/980
(Continued)

FOREIGN PATENT DOCUMENTS

JP    HEI 07-287761 A    10/1995
JP    HEI 08-191419 A    7/1996
(Continued)

*Primary Examiner* — Jared Walker
(74) *Attorney, Agent, or Firm* — Chip Law Group

(57) ABSTRACT

A first-person viewpoint image captured by a camera mounted on a radio-controlled model is displayed on a head mount display and is enjoyed. When a whole-sky image captured by a camera unit that is mounted on a model apparatus is reproduced and displayed with a head mount display, a CPU moves the display field so as to offset the motion of the head of a user detected by a posture/location detecting unit. In this manner, an image that follows the motion of the head of the user is displayed. Meanwhile, on the side of the head mount display, a combined image generated by superimposing an AR image as virtual image information on the actual image in the display field is displayed.

21 Claims, 31 Drawing Sheets

(51) Int. Cl.
- *G02B 27/02* (2006.01)
- *H04N 13/239* (2018.01)
- *H04N 13/296* (2018.01)
- *H04N 13/344* (2018.01)
- *H04N 13/366* (2018.01)
- *G06F 3/147* (2006.01)
- *G09G 5/00* (2006.01)
- G09G 5/14 (2006.01)
- G09G 3/00 (2006.01)

(52) U.S. Cl.
CPC ......... *H04N 13/296* (2018.05); *H04N 13/344* (2018.05); *H04N 13/366* (2018.05); *G09G 3/003* (2013.01); *G09G 5/14* (2013.01); *G09G 2340/045* (2013.01); *G09G 2340/0464* (2013.01); *G09G 2340/12* (2013.01); *G09G 2340/14* (2013.01); *G09G 2354/00* (2013.01)

(58) Field of Classification Search
CPC ......... G09G 2340/045; G09G 2340/12; G09G 2340/14; G09G 5/14; G09G 2354/00; H04N 13/0239; H04N 13/0296; H04N 13/044; H04N 13/0468
USPC .......................................................... 348/47
See application file for complete search history.

(56) References Cited

U.S. PATENT DOCUMENTS

| | | | | |
|---|---|---|---|---|
| 2008/0118103 | A1* | 5/2008 | Pescatore | A61B 90/36 382/103 |
| 2010/0020169 | A1* | 1/2010 | Jang | G01C 21/36 348/115 |
| 2011/0140994 | A1* | 6/2011 | Noma | G02B 27/017 345/8 |
| 2011/0238079 | A1* | 9/2011 | Hannaford | G06F 3/011 606/130 |
| 2011/0304697 | A1* | 12/2011 | Kim | H04N 5/23293 348/47 |
| 2012/0081236 | A1* | 4/2012 | Best | G02B 27/0093 340/945 |

FOREIGN PATENT DOCUMENTS

| | | |
|---|---|---|
| JP | HEI 09-037137 A | 2/1997 |
| JP | HEI 09-106322 A | 4/1997 |
| JP | HEI 10-070740 A | 3/1998 |
| JP | 2001-209426 A | 8/2001 |
| JP | 2005-297168 A | 10/2005 |
| JP | 2008-147865 A | 6/2008 |
| JP | 2010-256534 A | 11/2010 |
| JP | 2011-128220 A | 6/2011 |
| JP | 2011-183824 A | 9/2011 |
| JP | 2012-143447 A | 8/2012 |
| JP | 2012-151800 A | 8/2012 |

* cited by examiner

LEFT-EYE CAMERA  RIGHT-EYE CAMERA

AT INCREASED VELOCITY

AT REDUCED VELOCITY

AT TIME OF ZOOMING-IN

AT TIME OF ZOOMING-OUT

FIG. 17
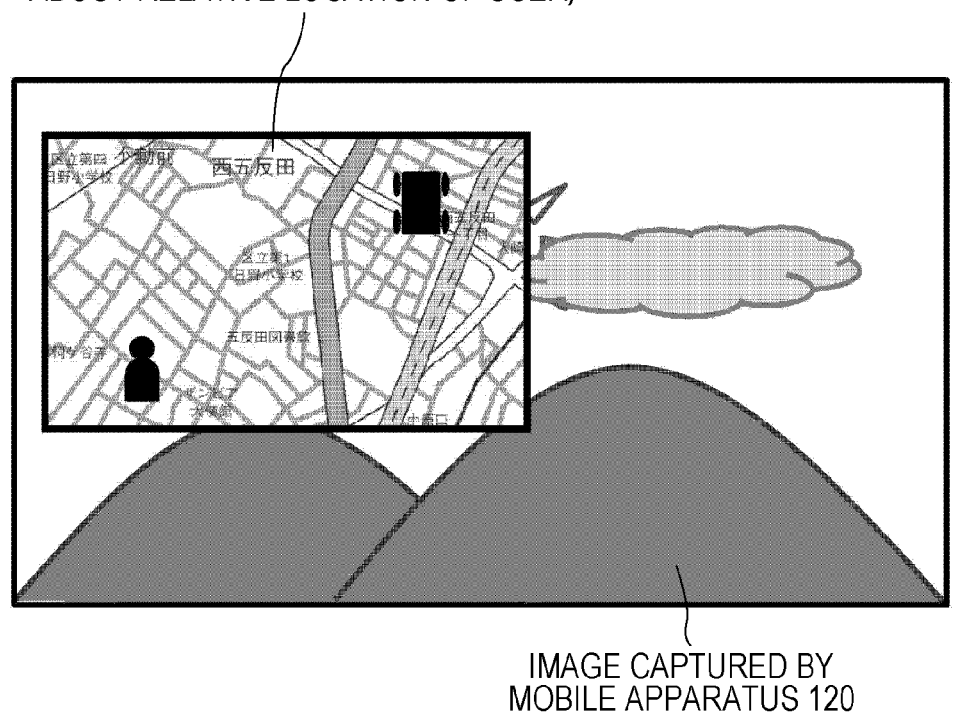
SMALL SCREEN (DISPLAY OF INFORMATION ABOUT RELATIVE LOCATION OF USER)
IMAGE CAPTURED BY MOBILE APPARATUS 120
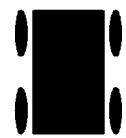 ICON INDICATING CURRENT LOCATION OF MOBILE APPARATUS 120
 ICON INDICATING CURRENT LOCATION OF USER

CAR-SIGHT-LINE IMAGE CAPTURED
BY MOBILE APPARATUS 120-2

IMAGE DISPLAY APPARATUS FOR DISPLAYING AN IMAGE CAPTURED BY A MOBILE APPARATUS

TECHNICAL FIELD

The technology disclosed in this specification relates to an image display apparatus that is mounted on the head or the face of a user and is used for viewing an image, an image display method, a mobile apparatus that captures images to be viewed while moving, an image display system, and a computer program. More particularly, the technology relates to an image display apparatus, an image display method, a mobile apparatus, an image display system, and a computer program that are used for viewing an image captured by an external camera, such as a whole-sky image, a fish-eye image, and a panoramic image.

BACKGROUND ART

An image display apparatus or a head mount display that is mounted on the head or the face and is used for viewing an image is well known. In a head mount display, a display unit is provided for each of the right and left eyes, and an enlarged virtual image of a display image is formed by a virtual image optical system so that a user can view an image with realistic sensation. If a head mount display is designed to completely block the outside world when mounted on the head of a user, the sense of immersion during the viewing is increased. A head mount display can also display different images for the right and left eyes, and can present a 3D image by displaying images with parallaxes for the right and left eyes.

With a head mount display, a wide-angle image can be viewed. For example, there is a disclosure of a head mount display with which a whole-space 360-degree image that follows motion of the head of a user having a gyro sensor attached to his/her head can be enjoyed (see Patent Document 1 and Patent Document 2, for example). The display region is moved so as to offset motion of the head detected by the gyro sensor. In this manner, an image that follows the motion of the head of the user can be presented.

Also, there is an application developed for enabling a user to view a live image captured by an external camera with a head mount display. For example, there is a disclosure of an image display system in which an image actually captured by an imaging device mounted on a moving object other than a human being such as a radio-controlled model is displayed on a display device a user is wearing (see Patent Document 3, for example).

There is also the FPV (First Person Viewing) technique known for enabling a user to control a radio-controlled model of a helicopter or the like while looking at a first-person viewpoint (pilot viewpoint) image captured by a wireless camera mounted on the radio-controlled model.

For example, there is a disclosure of an aerial imaging system in which an all-direction camera that captures images of the surroundings and a laser distance meter that measures the altitude of the all-direction camera from the ground are mounted on a small-size helicopter that has its flight altitude and flight velocity controlled by a flight control device, and aerial imaging is performed with the all-direction camera at a predetermined altitude based on the altitude measured by the laser distance meter (see Patent Document 4, for example). Images captured by the all-direction camera can be transmitted to an external computer via a communication network.

Further, there is a disclosure of a network system in which a radio-controlled model car equipped with a mid- and long-range three-dimensional stereo camera and a short-range three-dimensional stereo camera transmits a three-dimensional combined image, and the three-dimensional combined image is displayed on the side of the controller (see Patent Document 5, for example).

Also, there is a disclosure of a network system that receives, on the side of the controller, an image generated by a model apparatus capturing an image of the scenery in front and information about the location and the orientation of the model apparatus, and generates and displays a virtual image in accordance with the location and the orientation (see Patent Document 6, for example).

CITATION LIST

Patent Documents

Patent Document 1: JP 9-106322 A
Patent Document 2: JP 2010-256534 A
Patent Document 3: JP 2008-147865 A, paragraphs [0024] through [0026]
Patent Document 4: JP 2011-183824 A
Patent Document 5: JP 2012-151800 A
Patent Document 6: JP 2012-143447 A

SUMMARY OF THE INVENTION

Problems to be Solved by the Invention

The technology disclosed in this specification aims to provide an image display apparatus, an image display method, a mobile apparatus, an image display system, and a computer program that are excellent and can be used in viewing an image captured by an external camera, such as a whole-sky image, a fish-eye image, or a panoramic image.

The technology disclosed in this specification further aims to provide an excellent image display apparatus capable of appropriately displaying a first-person viewpoint image captured by a camera mounted on a mobile apparatus such as a radio-controlled model, and also provide an image display method, a mobile apparatus, an image display system, and a computer program.

Solutions to Problems

This application is made in view of the above problems, and the technology disclosed in claim 1 is an image display apparatus that includes:
a display unit mounted on the head of a user;
a posture detecting unit that detects posture of the head; and
a display control unit that controls display of an image on the display unit based on the posture of the head, the image being captured by a mobile apparatus.

According to the technology disclosed in claim 2 of this application, the display control unit of the image display apparatus of claim 1 clips a region corresponding to the posture of the head from a wide-angle image captured by the mobile apparatus, and displays the clipped region on the display unit.

According to the technology disclosed in claim 3 of this application, when a plurality of viewpoint images captured at a plurality of viewpoints by a deep focus parallel method is displayed, the display control unit of the image display apparatus of claim 1 adjusts the convergence point between the viewpoint images based on the movement velocity of the moving object.

According to the technology disclosed in claim 4 of this application, the display control unit of the image display apparatus of claim 1 displays an image with an inter-viewpoint distance corresponding to a zooming operation on the display unit.

According to the technology disclosed in claim 5 of this application, the image display apparatus of claim 1 offsets the direction of the line of sight of a camera unit of the mobile apparatus in at least one of the directions of panning, tilting, and rolling with respect to the posture of the head.

According to the technology disclosed in claim 6 of this application, the image display apparatus of claim 1 further including an operational feeling feedback unit that feeds back an operational feeling to the user through tactile sensation or vibration, wherein the feedback to the user is based on the acceleration to which the mobile apparatus is subjected while moving.

According to the technology disclosed in claim 7 of this application, the display control unit of the image display apparatus of claim 1 superimposes an AR image on a real-world image captured by the mobile apparatus, before displaying the image.

According to the technology disclosed in claim 8 of this application, the display control unit of the image display apparatus of claim 7 displays the AR image corresponding to at least one of the current location of the mobile apparatus, an object included in the captured image, and the state of the mobile apparatus.

According to the technology disclosed in claim 9 of this application, the display control unit of the image display apparatus of claim 1 displays location information about the mobile apparatus and the user.

According to the technology disclosed in claim 10 of this application, the display control unit of the image display apparatus of claim 1 further displays an image captured by an automatic tracker that captures the image while tracking the mobile apparatus.

According to the technology disclosed in claim 11 of this application, the image display apparatus of claim 1 further includes a self-sight-line image acquiring unit that acquires a self-sight-line image to be seen on the line of sight of the user. The display control unit switches the image being displayed between a moving-object sight-line image captured by the mobile apparatus and the self-sight-line image.

According to the technology disclosed in claim 12 of this application, the display control unit of the image display apparatus of claim 1 switches the image being displayed between images captured from a plurality of viewpoint positions of the mobile apparatus in accordance with the posture of the head.

According to the technology disclosed in claim 13 of this application, the display control unit of the image display apparatus of claim 1 corrects shaking in a moving image captured by the mobile apparatus, before displaying the moving image.

The technology disclosed in claim 14 of this application is an image display method that includes:

a posture detecting step of detecting posture of the head of a user; and a display control step of controlling display of an image based on the posture of the head, the image being captured by a mobile apparatus.

The technology disclosed in claim 15 of this application is an image display system that includes:

a mobile apparatus that captures an image while moving; and an image display apparatus that displays the image captured by the mobile apparatus in accordance with posture of the head of a user.

It should be noted that the term "system" means a logical assembly of devices (or functional modules that realize specific functions), and the respective devices or functional modules are not necessarily in a single housing.

The technology disclosed claim 16 of this application is a mobile apparatus that includes:

a camera unit;

a camera platform that controls the direction of the line of sight of the camera unit;

a moving unit that moves the apparatus; and a communication unit that communicates data including an image captured by the camera unit, wherein the camera unit includes a plurality of cameras that perform imaging by a deep focus parallel method, the cameras having different viewpoints.

According to the technology disclosed in claim 17 of this application, the mobile apparatus of claim 16 captures a whole-sky image while changing the inter-viewpoint distance between the cameras with different viewpoints.

According to the technology disclosed in claim 18 of this application, the mobile apparatus of claim 16 extrapolates images outside the viewpoints of the cameras from images captured by the cameras with different viewpoints at a fixed inter-viewpoint distance from each other.

The technology disclosed in claim 19 of this application is a computer program written in a computer-readable format, the computer program causing a computer to function as:

a posture detecting unit that detects posture of the head of a user; and a display control unit that controls display of an image based on the posture of the head, the image being captured by a mobile apparatus.

The computer program according to claim 19 of this application defines a computer program written in a computer-readable format so as to realize predetermined processing in a computer. In other words, as the computer program according to claim 19 of this application is installed into a computer, cooperative actions are realized in the computer, and the same effects as those of the image display apparatus according to claim 1 of this application can be achieved.

Effects of the Invention

The technology disclosed in this specification provides an excellent image display apparatus that can present an image with realistic sensation by displaying a first-person viewpoint image captured by a camera mounted on a mobile apparatus such as a radio-controlled model on a screen placed in front of the eyes of a user, and also provides an image display method, an image display system, a mobile apparatus, and a computer program.

Other objects, features, and advantages of the technology disclosed in this specification will be made apparent by the embodiments described below and the detailed descriptions with reference to the accompanying drawings.

BRIEF DESCRIPTION OF DRAWINGS

FIG. 17 is a diagram showing a situation where location information about a user is displayed as a small screen in the screen displaying an image captured by a mobile apparatus 120.

MODES FOR CARRYING OUT THE INVENTION

The following is a detailed description of embodiments of the technology disclosed in this specification, with reference to the drawings.

A. System Configuration

Figure 1:
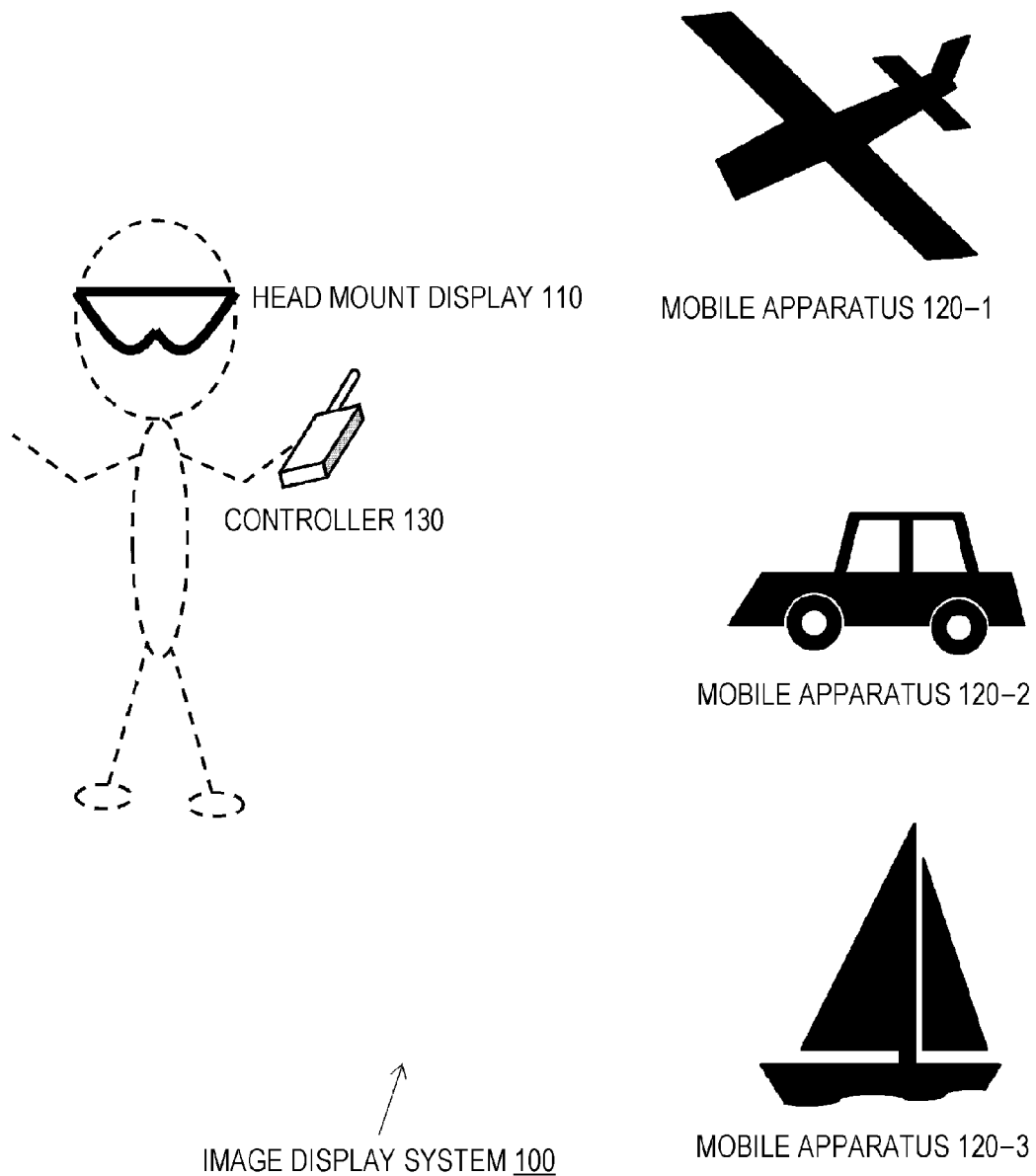
FIG. 1 is a diagram schematically showing the configuration of an image display system 100 according to an embodiment of the technology disclosed in this specification.

FIG. 1 schematically shows the configuration of an image display system 100 according to an embodiment of the technology disclosed in this specification. The image display system 100 shown in the drawing includes an image display apparatus (a head mount display) 110 mounted on the head or the face of a user, mobile apparatuses 120-1, 120-2, 120-3, and others that are mobile models of an aircraft (or a helicopter or some other flying object), an automobile, a watercraft, and the like, and a controller 130 that wirelessly controls the mobile apparatuses 120. Each of the mobile apparatus 120-1, 120-2, 120-3, and others is equipped with a wireless camera (not shown), and captures images of scenery while moving. The controller 130 may be a multifunctional information terminal such as a smartphone, and starts an application for controlling the mobile apparatuses 120.

The head mount display 110 and the mobile apparatuses 120, and the controller 130 and the mobile apparatuses 120 are wirelessly connected via a wireless network or infrared communication or the like.

Each of the mobile apparatuses 120 is equipped with a wireless camera (not shown) via a camera platform that can change its posture about the respective axes of panning, tilting, and yawing. This wireless camera can capture whole-sky images or celestial sphere images, or panoramic images such as half-sky images and lesser images. Alternatively, the wireless camera can perform wide-angle imaging, using a fish-eye lens.

The mobile apparatuses 120 transmit images captured with the wireless cameras to the controller 130 and the head mount display 110. In a case where captured images can be transferred directly between the head mount display 110 and the mobile apparatuses 120, however, the mobile apparatuses 120 do not need to transfer captured images to the controller 130, and wireless connection between the controller 130 and the head mount display 110 is not necessary. In the description below, the controller 130 will not be described in detail on the assumption that data communication can be performed directly between the head mount display 110 and the mobile apparatuses 120.

Although the user wearing the head mount display 110 is controlling the mobile apparatuses 120 with the controller 130 in the example shown in FIG. 1, a different person from the user who enjoys captured images sent from the mobile apparatuses 120 with the head mount display 110 may control the mobile apparatuses 120 with the controller 130.

Figure 2:
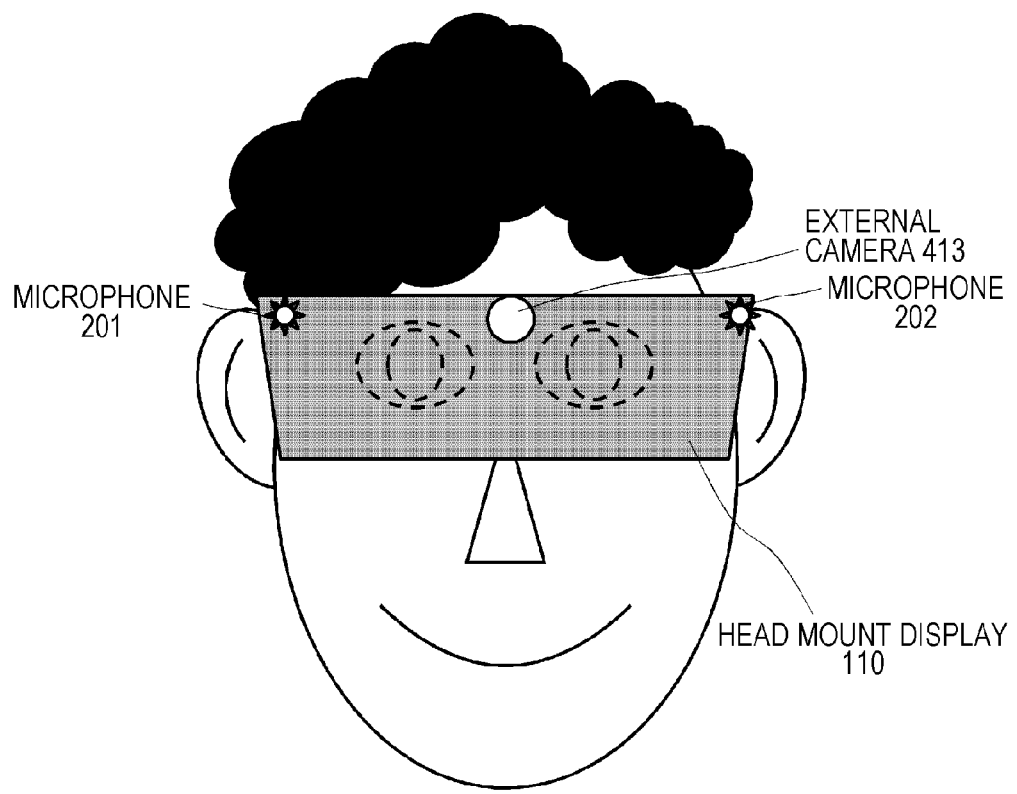
FIG. 2 is a front view of a user wearing a head mount display 110.

FIG. 2 is a front view of the user wearing the head mount display 110. The head mount display 110 shown in the drawing is a structure having a shape similar to that of a pair of glasses, and is designed to directly cover the right and left eyes of the user wearing the head mount display 110. At the locations on the inner side of the main frame of the head mount display 110 facing the right and left eyes, display panels (not shown in FIG. 2) the user is observing are provided. The display panels are formed with microdisplays such as organic EL devices or liquid crystal displays.

At almost the center of the front surface of the main frame of the head mount display 110 having an eyeglass-like shape, an external camera 413 for inputting surroundings images (the user's vision) is provided. Further, microphones 201 and 202 are provided near the right and left ends of the supporting member, respectively. As the two microphones 201 and 202 are provided, only the voice localized at the center (the user's voice) is recognized and can be separated from ambient noise and voices of the other people. For example, an incorrect operation during a voice input operation can be prevented.

Figure 3:
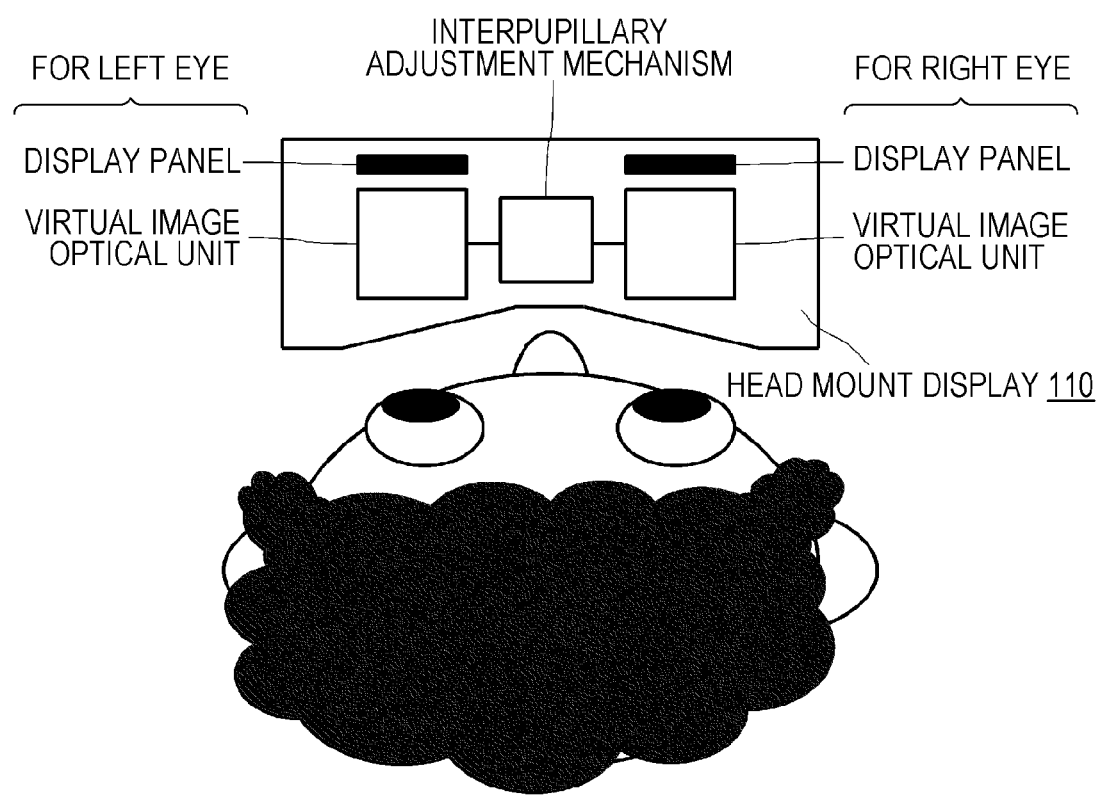
FIG. 3 is a top view of the user wearing the head mount display 110 shown in FIG. 2.

FIG. 3 is a top view of the user wearing the head mount display 110 shown in FIG. 2. The head mount display 110 shown in the drawing has display panels for the left eye and the right eye on the side surfaces facing the face of the user. The display panels are formed with microdisplays such as organic EL devices or liquid crystal displays. Images displayed on the right and left display panels are observed as enlarged virtual images with the right and left eyes of the user, having passed through the respective virtual image optical units. Since the eye height and the interpupillary distance vary among individuals, positioning needs to be performed between the respective right and left display systems and the eyes of the user. In the example shown in FIG. 3, an interpupillary adjustment mechanism is provided between the display panel for the right eye and the display panel for the left eye.

Figure 4:
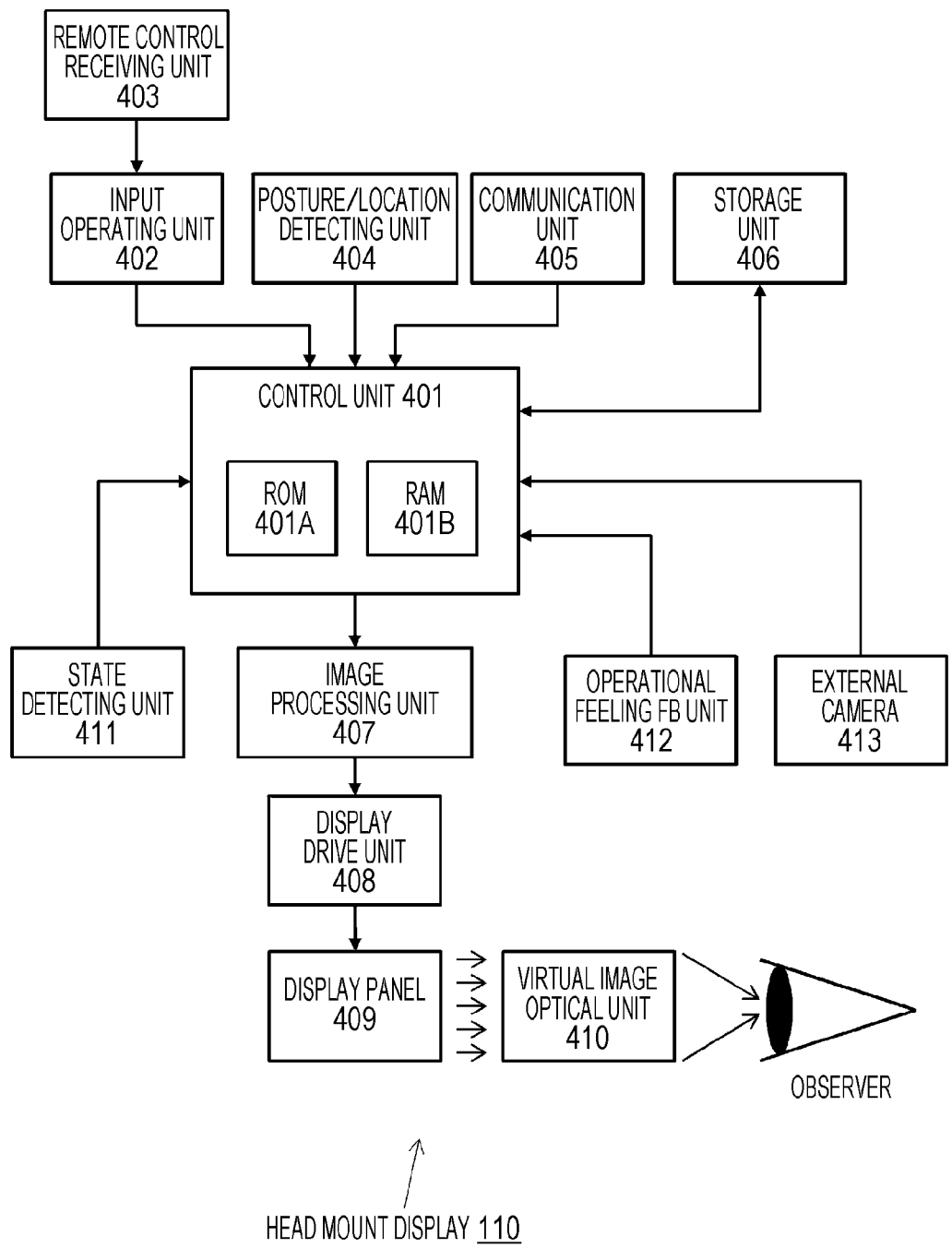
FIG. 4 is a diagram showing an example internal structure of the head mount display 110.

FIG. 4 shows an example internal structure of the head mount display 110. The following is a description of the respective components.

A control unit 401 includes a ROM (Read Only Memory) 401A and a RAM (Random Access Memory) 401B. The ROM 401A stores program codes to be executed by the control unit 401, and various kinds of data. By executing a program loaded into the RAM 401B, the control unit 401 starts image display control, and collectively controls operations of the entire head mount display 11000. Examples of programs and data stored in the ROM 401A include an image display control program, a program for processing communication with external devices such as the mobile apparatuses 120 and the controller 130, and identification information unique to this apparatus 110. The image display control program is for performing display control on captured images received from the mobile apparatuses 120, for example, but will be described later in detail.

An input operating unit 402 includes one or more operation pieces with which the user performs an input operation, such as keys, buttons, or switches. The input operating unit 402 receives a user instruction via the operation pieces, and outputs the user instruction to the control unit 401. The input operating unit 402 also receives a user instruction formed with a remote control command received by a remote control receiving unit 403, and also outputs this user instruction to the control unit 401.

A posture/location detecting unit 404 is a unit that detects the posture of the head of the user wearing the head mount display 110. The posture/location detecting unit 404 is formed with a gyro sensor, an acceleration sensor, a GPS (Global Positioning System) sensor, or a geomagnetic sensor. Alternatively, the posture/location detecting unit 404 is formed with a combination of two or more of those sensors, with the advantages and the disadvantages of the respective sensors being taken into consideration.

Figure 5:
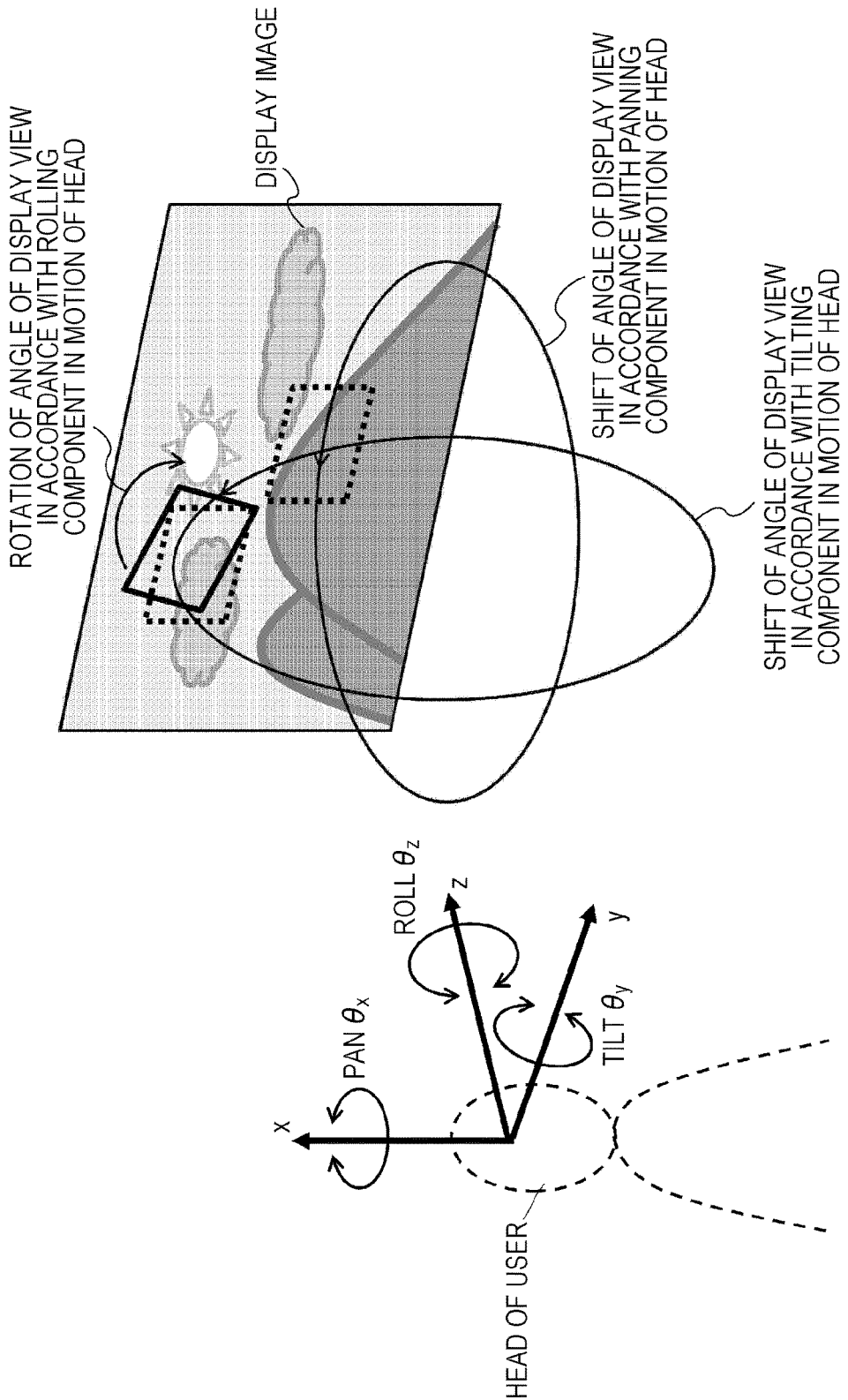
FIG. 5 is a diagram showing the system of coordinates in the posture to be detected by the posture/location detecting unit 404.

FIG. 5 shows the system of coordinates in the posture to be detected by the posture/location detecting unit 404. The depth direction of a display image (an enlarged virtual image) is the z-axis, the horizontal direction is the y-axis, the vertical direction is the x-axis, and the position of the origin of the x-, y-, and z-axes is the viewpoint position. Accordingly, the roll $\theta_z$ is equivalent to the motion of the head of the user about the z-axis, the tilt $\theta_y$ is equivalent to the motion of the head of the user about the y-axis, and the pan $\theta_x$ is equivalent to the motion of the head of the user about the x-axis. The posture/location detecting unit 404 detects the motions ($\theta_z$, $\theta_y$, and $\theta_x$) in the respective directions of rolling, tilting, and panning of the head of the user, and the parallel motion of the head, and then outputs the motions to the control unit 401. As will be described later, when displaying an image captured by a mobile apparatus 120 on the screen of a display panel 409, the control unit 401 can present an image that follows the motion of the head of the user by moving the display field so as to offset the motion of the head detected by the posture/location detecting unit 404.

A state detecting unit 411 acquires state information about the state of the user wearing the head mount display 110, and outputs the state information to the control unit 401. For example, the operating state of the user (whether the user is wearing the head mount display 110), the state of action of the user (the motion state such as a resting state, a walking state, or a running state, the opened/closed state of the eyelids, or the direction of the line of sight), the mental state (the level of excitement, consciousness, feeling, or emotion, such as whether the user is absorbed in or concentrates on observing the display image), and the physiological state are obtained as the state information. So as to acquire the state information from the user, the state detecting unit 411 may include various kinds of state sensors (not shown) such as an attachment sensor formed with a mechanical switch or the like, a gyro sensor, an acceleration sensor, a velocity sensor, a pressure sensor, a body temperature sensor, a perspiration sensor, a myoelectric potential sensor, an ocular potential sensor, and a brain-wave sensor.

An operational feeling feedback (FB) unit 412 includes a vibration generator or the like, and gives operational feeling feedback to the user wearing the head mount display 110 through tactile sensation or vibration.

The external camera 413 is placed at almost the center of the front surface of the main frame of the head mount display 110 having an eyeglass-like shape or a hat-like shape (see FIG. 2), and can capture images of the surroundings. Also, posture control in the panning, tilting, and rolling directions of the external camera 413 is performed in accordance with the direction of the user's line of sight detected by the state information detecting unit 411, so that an image on the level of the user's line of sight can be captured with the external camera 413. Furthermore, the relative velocities of the mobile apparatuses 120 can be measured with the external camera 413.

A communication unit 405 performs a communication process with external devices such as the mobile apparatuses 120 and the controller 130, and also performs modulation/demodulation processes and encoding/decoding processes on communication signals. For example, the communication unit 405 receives images captured by wireless cameras from the mobile apparatuses 120. Images received, demodulated, and decoded by the communication unit 405, or other received data is supplied to the control unit 401. The control unit 401 also sends data to be transmitted to external devices through the communication unit 405.

The communication unit 405 can have any structure. For example, the communication unit 405 can be designed in accordance with the communication standard to be used in transmitting/receiving operations with external devices with which communication is to be performed. The communication standard may be for either cable communication or wireless communication. Here, the communication standard may be MHL (Mobile High-definition Link), USB (Universal Serial Bus), HDMI (a registered trade name) (High Definition Multimedia Interface), Wi-Fi (a registered trade name), Bluetooth (a registered trade name) communication, or infrared communication, for example.

A storage unit 406 is a large-capacity storage that is formed with an SSD (Solid State Drive) or the like. The storage unit 406 stores the application program to be executed by a control unit 701, and the data of whole-sky images, fish-eye images, panoramic images, and the like captured by the mobile apparatuses 120.

An image processing unit 407 further performs signal processing such as image quality correction on the image signals output from the control unit 401, and converts the resolution of the image signals to a resolution compatible with the screen of the display panel 409. A display drive unit 408 sequentially selects the pixels of the display panel 409 by the row, and performs line sequential scanning on the pixels, to supply pixel signals based on the image signals subjected to the signal processing.

The display panel 409 is formed with a microdisplay such as an organic EL (Electro-Luminescence) device or a liquid crystal display. A virtual image optical unit 410 enlarges the image displayed on the display panel 409, and projects the image as an enlarged virtual image for the user to see.

The virtual image optical unit 410 enlarges the image displayed on the display panel 409 at a magnification of 1000 or more, for example, and forms, on the retina, an approximately 750-inch virtual image 20 meters away from the eyes of the user. This is equivalent to 45.09 degrees in the horizontal angle of view of the displayed pixels.

Figure 6:
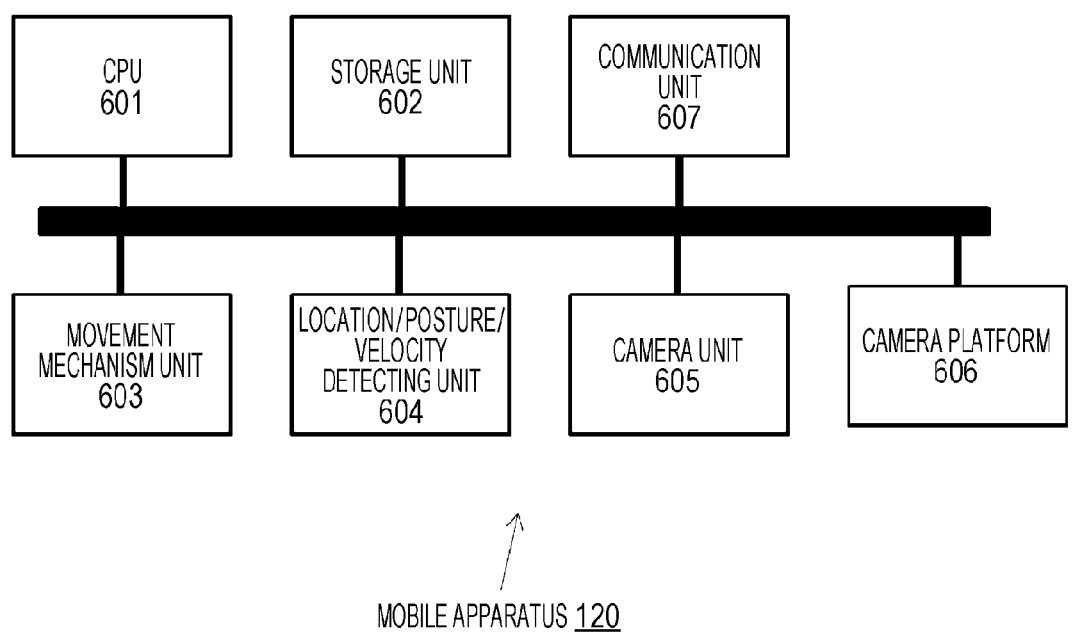
FIG. 6 is a diagram showing an example internal structure of a mobile apparatus 120.

FIG. 6 shows an example internal structure of a mobile apparatus 120. As shown in FIG. 1, the mobile apparatuses 120 are models of a moving object such as an aircraft, a helicopter, an automobile, a watercraft, and the like, and basically vary in a movement mechanism unit 603 while are substantially identical in the other functional aspects.

A storage unit 602 is realized by a memory device such as a RAM or a ROM, and a large-capacity storage such as a hard disk drive or an SSD. The storage unit 602 is used to store the program to be executed by a CPU (Central Processing Unit) 601, and images captured by a camera. The CPU 601 controls the respective components in the mobile apparatus 120 by executing the program stored in the storage unit 602.

The mobile apparatus 120 has the movement mechanism unit 603 that varies with the type of the moving object such as an aircraft, a helicopter, an automobile, or a watercraft, and the movement mechanism unit 603 is activated in accordance with a movement instruction from the CPU 601, and moves the mobile apparatus 120.

A location/posture/velocity detecting unit 604 includes a gyro sensor, an acceleration sensor, a GPS sensor, a geomagnetic sensor, and the like, and acquires information about the current location and posture of the mobile apparatus 120, and information about the velocity of movement caused by the movement mechanism unit 603. In the case of the mobile apparatus 120-2, which is an automobile, the location/posture/velocity detecting unit 604 can calculate the movement velocity from the number of revolutions of the motor that rotates the wheels, the gear ratio of the reducer, and the diameter of the tires, for example. If these numerical values are measured before shipment, and the data is stored in the storage unit 602, the velocity can be calculated simply by measuring the number of revolutions of the motor at a time of usage.

A camera unit 605 is formed with a stereo camera, for example, and can capture three-dimensional images. The camera unit 605 is mounted on the mobile apparatus 120 via a camera platform 606. The camera unit 605 in the default position faces forward with respect to the mobile apparatus 120 (or faces in the direction of movement caused by operation of the movement mechanism unit 603), and primarily captures first-person viewpoint (FPV) images.

Figure 8A:
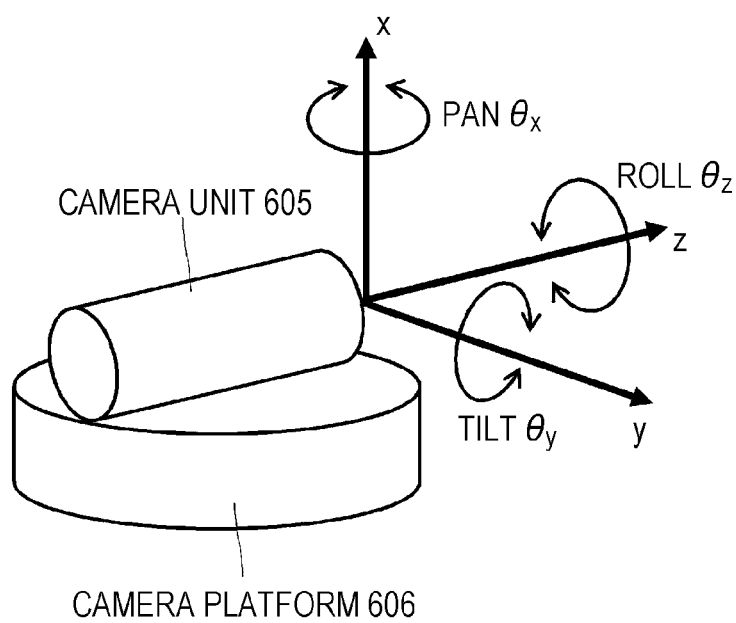
FIG. 8A is a diagram showing a situation where a camera unit 605 is mounted so that a camera platform 606 can control the line of sight in the respective directions of rolling, tilting, and panning.

The camera platform 606 can operate in the respective directions of rolling, tilting, and panning, and changes the line of sight of the camera unit 605 in accordance with a sight-line change instruction from the CPU 601. Accordingly, the camera unit 605 can capture wide-angle images such as panoramic images, and whole-sky images. FIG. 8A shows a situation where the camera unit 605 is mounted so that the camera platform 606 can control the line of sight in the respective directions of rolling, tilting, and panning.

Figure 8B:
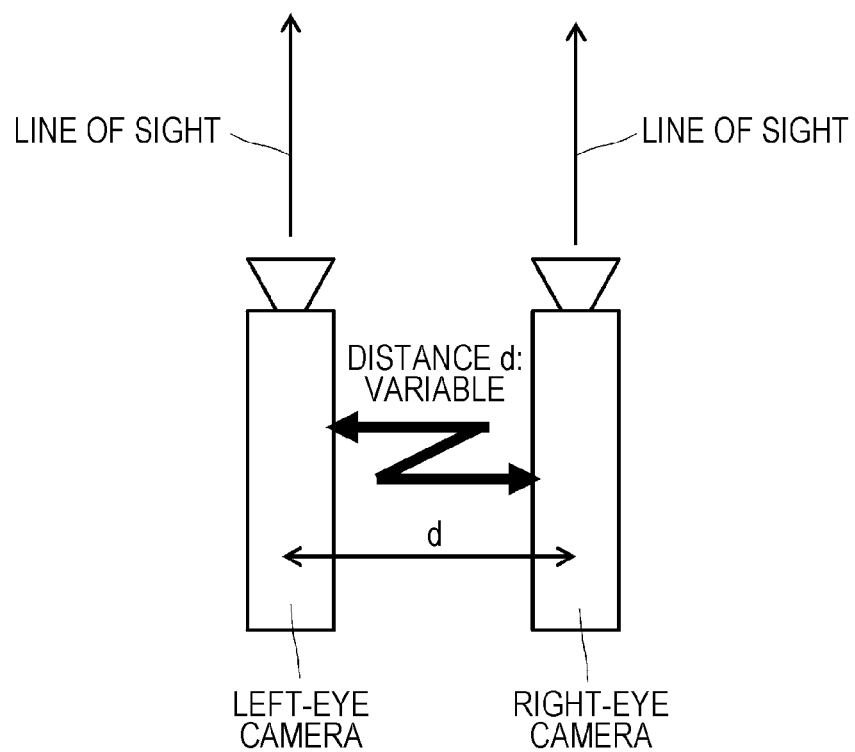
FIG. 8B is a diagram showing a situation where the distance between the left-eye camera and the right-eye camera that constitute a stereo camera is variable.

The camera unit 605 can adjust the inter-viewpoint distance d between the two cameras forming the stereo camera. FIG. 8B shows a situation where the inter-viewpoint distance d between the left-eye camera and the right-eye camera that constitute the stereo camera is variable. In this embodiment, there is no convergence between the left-eye camera and the right-eye camera, and the respective lines of sight are almost parallel. More preferably, the left-eye camera and the right-eye camera use deep focus, or perform imaging by increasing the depth of the object.

Figure 8C:
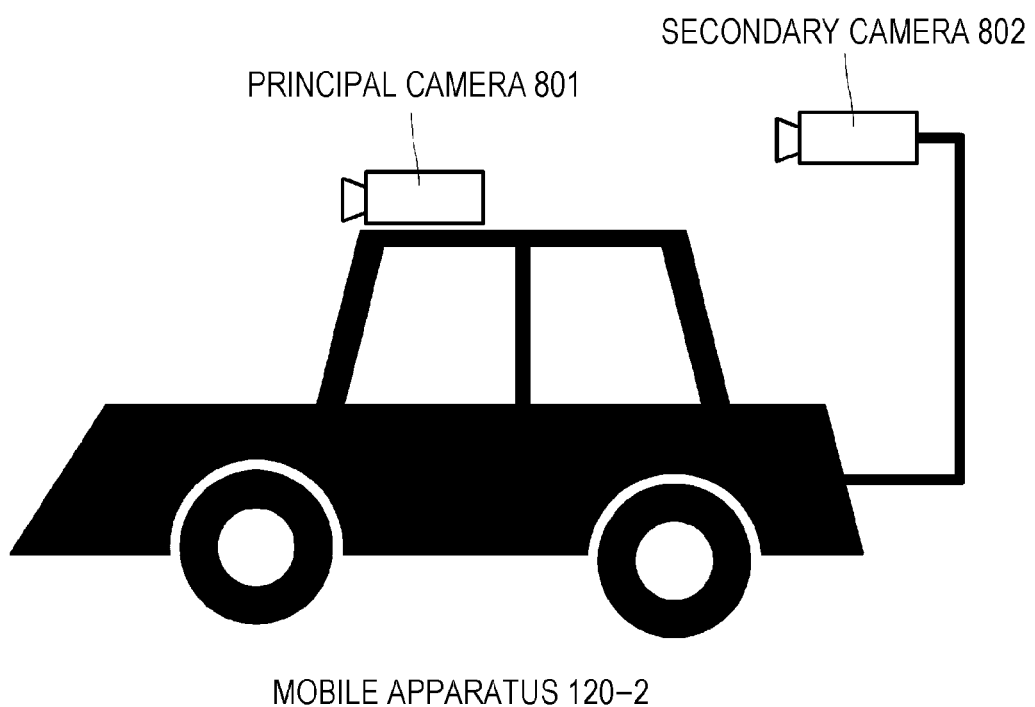
FIG. 8C is a diagram showing a situation where a principal camera 801 is mounted on the main frame of a mobile apparatus 120-2 as an automobile, and a secondary camera 802 is mounted behind the principal camera 801.

The camera unit 605 may be formed with two or more cameras, such as a principal camera that captures first-person viewpoint images, and a secondary camera that performs imaging from behind the main frame of the mobile apparatus 120. FIG. 8C shows a situation where a principal camera 801 is mounted on the main frame of the mobile apparatus 120-2 as an automobile, and a secondary camera 802 is mounted behind the principal camera 801.

A communication unit 607 performs a communication process with external devices such as the head mount display 110 and the controller 130, and also performs modulation/demodulation processes and encoding/decoding processes on communication signals. For example, when the communication unit 607 receives a movement instruction from the controller 130, the CPU 601 instructs the movement mechanism unit 603 to move. The communication unit 607 also transmits an image captured by the camera unit 605, the information about the location and the posture of the main frame of the mobile apparatus 120 detected by the location/posture detecting unit 604, to the head mount display 110 and the controller 130.

In the image display system 100 according to this embodiment, an image captured by the camera unit 605 mounted on the mobile apparatus 120 is transferred via the controller 130 or directly to the head mount display 110. Accordingly, the user can enjoy the captured image sent from the mobile apparatus 120 with the head mount display 110.

Also, in the image display system 100 according to this embodiment, when a wide-angle image such as a panoramic image or a whole-sky image captured by the camera unit 605 mounted on the mobile apparatus 120 is reproduced and displayed with the head mount display 110, the CPU 601 moves the display field so as to offset the motion of the head of the user detected by the posture/location detecting unit 604. In this manner, an image that follows the motion of the head of the user is displayed. On the side of the head mount display 110, a combined image generated by superimposing an AR (Augmented Reality) image as virtual image information on the actual image in the display field is displayed as necessary.

Figure 7:
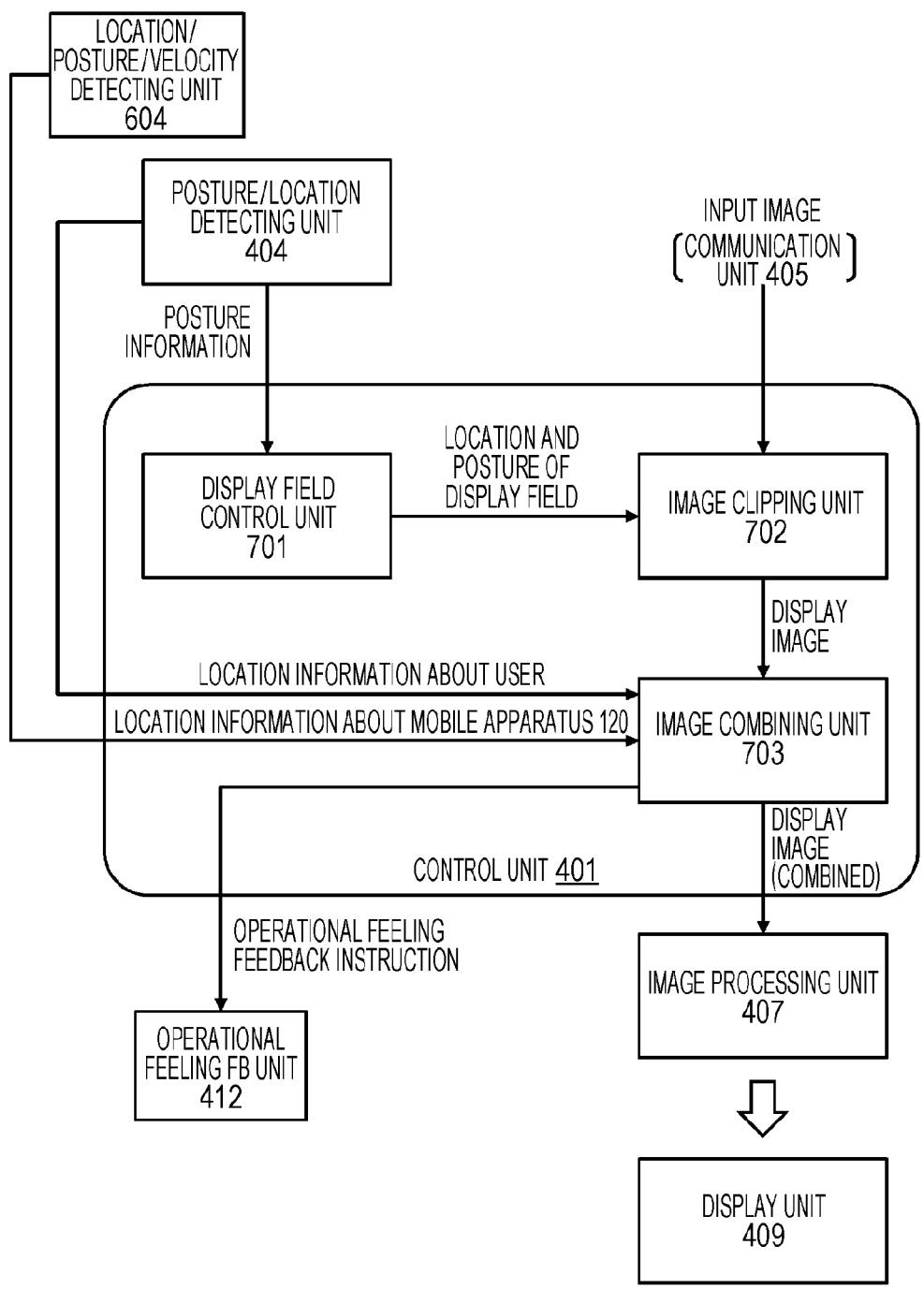
FIG. 7 is a diagram schematically showing the functional structure of a control unit 401 for displaying an image captured on the side of the mobile apparatus 120 with the head mount display 110.

FIG. 7 schematically shows the functional structure of the control unit 401 for displaying an image captured on the side of the mobile apparatus 120 with the head mount display 110. The functional structure shown in the drawing is realized by the control unit 401 executing a predetermined application program, for example.

The display field control unit 701 moves the position and the posture of the display field (see FIG. 5) displayed on the display panel 409 in accordance with the motion of the head of the user detected through the posture/location detecting unit 404, and outputs the determined display field to an image clipping unit 702.

The image clipping unit 702 clips the image in the display field determined by the display field control unit 701 from the image captured by the mobile apparatus 120 and received by the communication unit 405, and outputs the clipped image to an image combining unit 703.

The image combining unit 703 generates a combined image by superimposing an AR image on the actual image in the display field as necessary, and outputs the combined image to the image processing unit 407 in the later stage. For example, when the current location of the user is acquired from the posture/location detecting unit 404, or when the current location of the mobile apparatus 120 is acquired, an AR image of a guide or obstacle corresponding to the location information is generated (described later). So as to give the user feedback of an operational feeling corresponding to the AR image such as collision with obstacle, the image combining unit 703 instructs the operational feeling feedback unit 412 to output feedback.

The image combining unit 703 also performs correction processing on distortion that appears when the image clipped from the display field is output to and displayed on the display panel 409.

Figure 9:
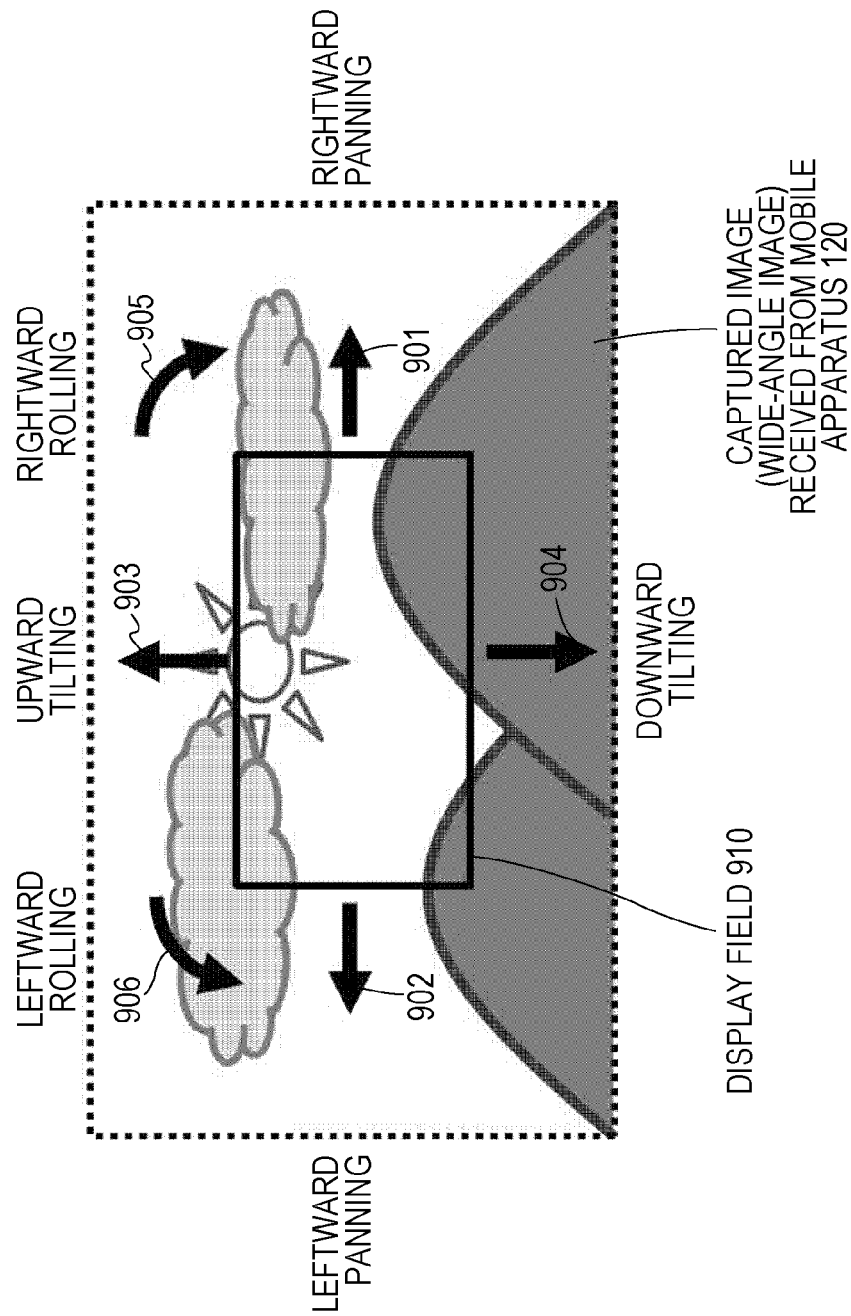
FIG. 9 is a diagram showing a situation where the position and the posture of a display field displayed on a display panel 409 are moved in accordance with motion of the head of a user.

FIG. 9 illustrates a situation where the position and the posture of the display field displayed on the display panel 409 are moved in accordance with motion of the head of the user.

When the posture/location detecting unit 404 detects that the head or the line of sight of the user has moved in a rightward panning direction, the display field control unit 701 moves the display field 910 in the direction of an arrow denoted by reference numeral 901 in the drawing. As a result, the image clipping unit 702 clips an image from the wide-angle image, and the image displayed on the display panel 409 also changes.

When the posture/location detecting unit 404 detects that the head or the line of sight of the user has moved in a leftward panning direction, the display field control unit 701 moves the display field 910 in the direction of an arrow denoted by reference numeral 902 in the drawing.

When the posture/location detecting unit 404 detects that the head or the line of sight of the user has moved in an upward tilting direction, the display field control unit 701 moves the display field 910 in the direction of an arrow denoted by reference numeral 903 in the drawing.

When the posture/location detecting unit 404 detects that the head or the line of sight of the user has moved in a downward tilting direction, the display field control unit 701 moves the display field 910 in the direction of an arrow denoted by reference numeral 904 in the drawing.

When the posture/location detecting unit 404 detects that the head or the line of sight of the user has moved in a rightward rolling direction, the display field control unit 701 moves the display field 910 in the direction of an arrow denoted by reference numeral 905 in the drawing.

When the posture/location detecting unit 404 detects that the head or the line of sight of the user has moved in a leftward rolling direction, the display field control unit 701 moves the display field 910 in the direction of an arrow denoted by reference numeral 906 in the drawing.

Figure 10:
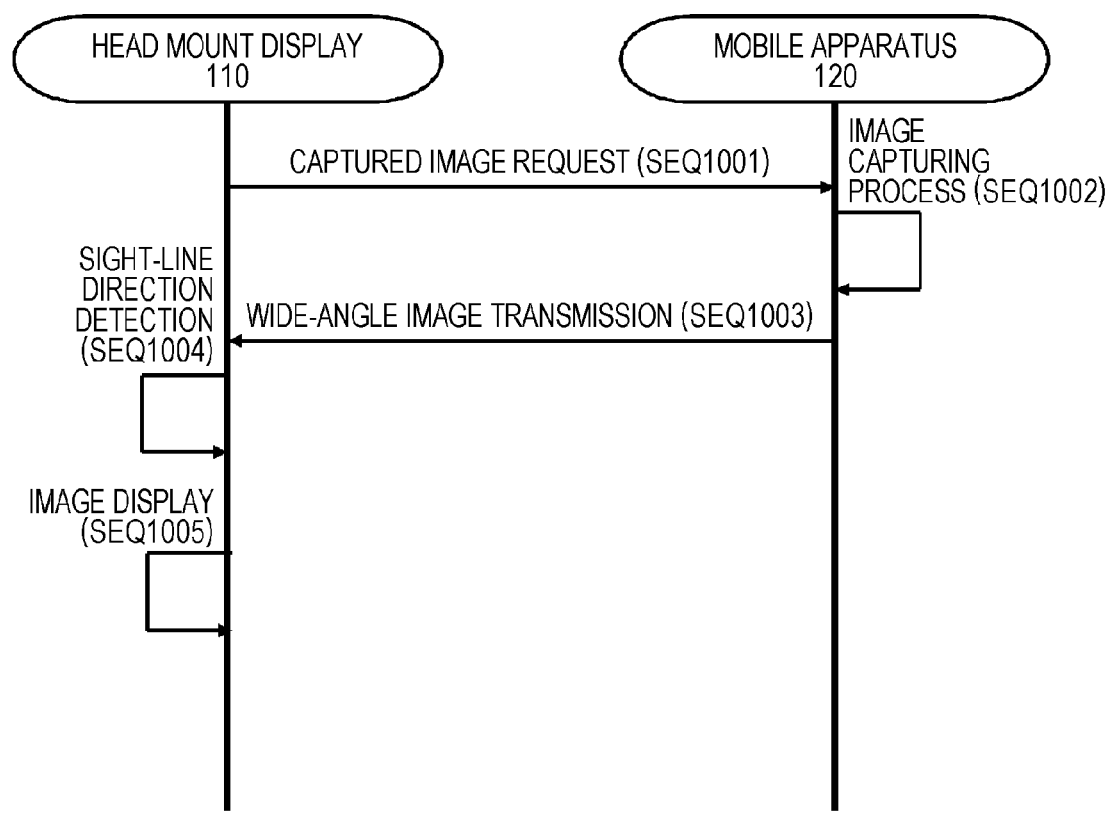
FIG. 10 is a diagram showing an example sequence of operation to display a wide-angle image such as a whole-sky image captured on the side of a mobile apparatus 120, the wide-angle image being made to follow the posture of the head of the user on the side of the head mount display 110.

FIG. 10 shows an example sequence of operation to display a wide-angle image such as a whole-sky image captured on the side of a mobile apparatus 120, the wide-angle image being made to follow the posture of the head of the user on the side of the head mount display 110. In the operation sequence shown in the drawing, data communication is performed directly between the head mount display 110 and the mobile apparatus 120, but some other apparatus such as the controller 130 may intervene between the head mount display 110 and the mobile apparatus 120.

The head mount display 110 transmits a captured image request to the mobile apparatus 120 that is moving while being remotely controlled by the controller 130 (SEQ1001).

In response to the captured image request, the mobile apparatus 120 performs an image capturing process with the camera unit 605 while driving the camera platform 606 (SEQ1002). After the captured image is processed, and a wide-angle image such as a whole-sky image is generated, the image is transmitted to the head mount display 110 (SEQ1003). However, the mobile apparatus 120 may not perform imaging in response to the request from the head mount display 110, but may constantly perform an imaging process, and transmit a wide-angle image such as a whole-sky image to the head mount display 110 at a predetermined time.

At the time of image transmission or some other time, the mobile apparatus 120 may also transmit information about the location, the posture, and the velocity of the main frame of the mobile apparatus 120 measured by the location/posture/velocity detecting unit 604.

On the side of the head mount display 110, the posture/location detecting unit 404 detects the motion of the head of the user, or the direction of the line of sight (SEQ1004). In accordance with the detected direction of the line of sight, the position of the display field to be clipped from the received captured image is controlled, and the clipped image is displayed on the display panel 409 (SEQ1005).

Figure 11:
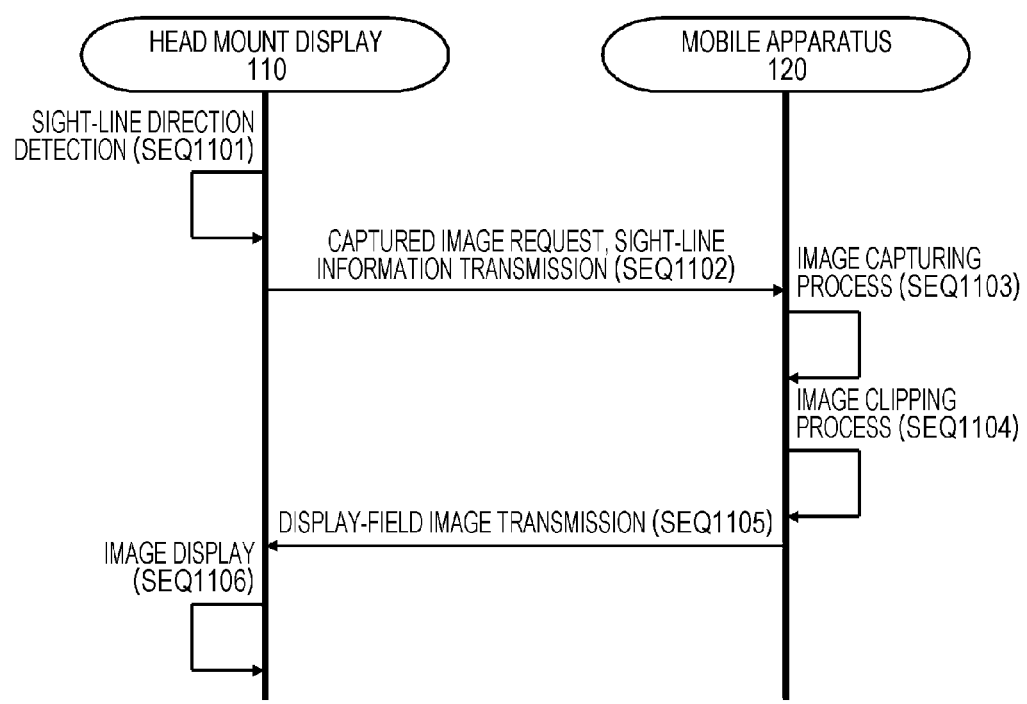
FIG. 11 is a diagram showing a modification of the sequence of operation to display a wide-angle image such as a whole-sky image captured on the side of a mobile apparatus 120, the wide-angle image being made to follow the posture of the head of the user on the side of the head mount display 110.

FIG. 11 shows a modification of the sequence of operation to display a wide-angle image such as a whole-sky image captured on the side of a mobile apparatus 120, the wide-angle image being made to follow the posture of the head of the user on the side of the head mount display 110. In the operation sequence shown in the drawing, data communication is performed directly between the head mount display 110 and the mobile apparatus 120, but some other apparatus such as the controller 130 may intervene between the head mount display 110 and the mobile apparatus 120.

On the side of the head mount display 110, the posture/location detecting unit 404 monitors motion of the head of the user, or the direction of the line of sight (SEQ1101).

The head mount display 110 transmits a captured image request to the mobile apparatus 120 that is moving while being remotely controlled by the controller 130 (SEQ1102). In doing so, the head mount display 110 also transmits sight-line information about the user.

In response to the captured image request, the mobile apparatus 120 performs an image capturing process with the camera unit 605 while driving the camera platform 606 (SEQ1103). After the captured image is processed, and a wide-angle image such as a whole-sky image is generated, an image in a display field in accordance with the line of sight of the user is clipped (SEQ1104), and is transmitted to the head mount display 110 (SEQ1105).

At the time of image transmission, the mobile apparatus 120 may also transmit information about the location, the posture, and the velocity of the main frame of the mobile apparatus 120 measured by the location/posture/velocity detecting unit 604. In the case of the mobile apparatus 120-2, which is an automobile, the movement velocity can be calculated from the number of revolutions of the motor, the gear ratio of the reducer, and the diameter of the tires, for example. Alternatively, on the side of the head mount display 110, the relative velocity of the mobile apparatus 120 can be measured with the external camera 413.

The head mount display 110 then displays the received image on the display panel 409 (SEQ1106).

When a wide-angle image such as a whole-sky image captured on the side of a mobile apparatus 120 is made to follow the posture of the head of the user and is displayed on the side of the head mount display 110, it is possible to execute either the operation sequence in FIG. 10 or the operation sequence in FIG. 11. For ease of explanation, the descriptions below are based on the assumption that the operation sequence shown in FIG. 10 is to be executed.

B. Image Processing Application

The following is a detailed description of the process to be performed when an image captured on the side of a mobile apparatus 120 is displayed on the head mount display 110.

B-1. Method of Displaying a Three-Dimensional Whole-Sky Image

The camera unit 605 is formed with a stereo camera, as shown in FIG. 8B. There is no convergence between the left-eye camera and the right-eye camera, the respective lines of sight are almost parallel, and deep focus imaging is performed.

Meanwhile, a human being tends to look at objects far away when moving at a high speed, but tends to look at nearby objects when moving at a low speed.

Figure 12A:
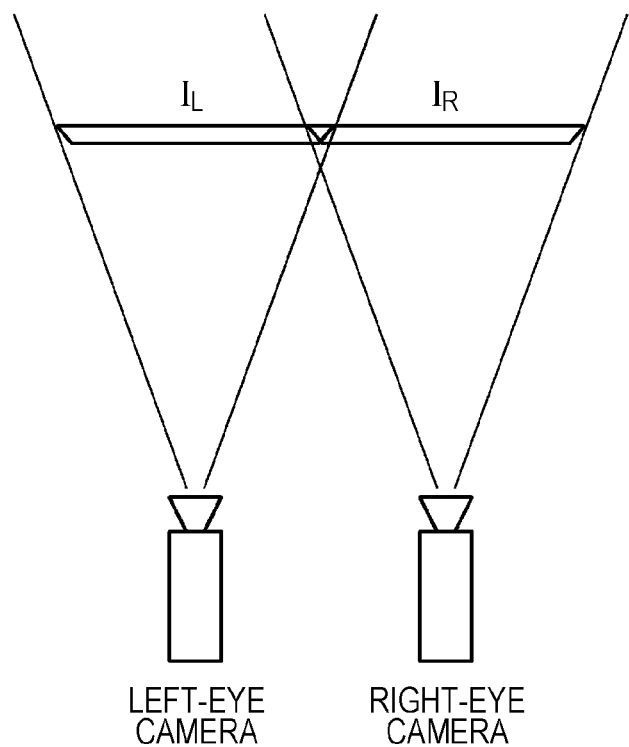
FIG. 12A is a diagram for explaining a method of controlling the convergence point when a three-dimensional captured image is displayed on the side of the head mount display 110 based on velocity information about a mobile apparatus 120.
Figure 12B:
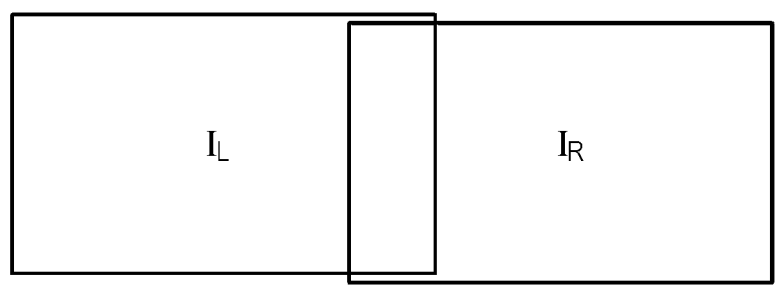
FIG. 12B is a diagram for explaining the method of controlling the convergence point when a three-dimensional captured image is displayed on the side of the head mount display 110 based on velocity information about a mobile apparatus 120.

In view of this, when the head mount display 110 displays an image capture by a mobile apparatus 120, the convergence point is adjusted based on the velocity information about the mobile apparatus 120 in the process performed by the image combining unit 703, for example.

Where $I_L$ and $I_R$ represent images captured by a left-eye camera and a right-eye camera using a deep focus parallel method (see FIG. 12A), as the velocity of the mobile apparatus 120 becomes higher, the overlap between the right and left images $I_L$ and $I_R$ is made smaller, so as to increase the distance to the convergence point or the point where the lines of sight of the right and left eyes intersect. In this manner, the user is made to observe an image that looks clearer at a longer distance (see FIG. 12B). In conjunction with the adjustment of the convergence point, focus point adjustment is also performed so that the regions other than the fixed screen position (the convergence point) are blurred. In this manner, the visual effect to make the user see faraway objects more clearly is increased, and the user can experience more realistic sensation of a journey on a high-speed moving object.

Figure 12C:
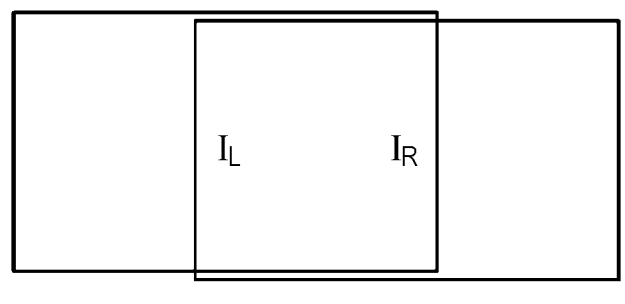
FIG. 12C is a diagram for explaining the method of controlling the convergence point when a three-dimensional captured image is displayed on the side of the head mount display 110 based on velocity information about a mobile apparatus 120.

As the velocity of the mobile apparatus 120 becomes lower, the overlap between the right and left images $I_L$ and $I_R$ is made larger, so as to shorten the distance to the convergence point or the point where the lines of sight of the right and left eyes. In this manner, the user is made to observe an image that is clearer at a shorter distance (see FIG. 12C). In conjunction with the adjustment of the convergence point, focus point adjustment is also performed so that the regions other than the fixed screen position are blurred. In this manner, the visual effect to make the user see nearby objects more clearly is increased, and the user can experience more realistic sensation of a journey on a low-speed moving object.

In short, with velocity-derived motion of the viewpoint including the focus point of the person being taken into account, the person can enjoy natural viewing. When the velocity of the mobile apparatus 120 becomes higher, the user can see objects further away through the head mount display 110. When the velocity of the mobile apparatus 120 becomes lower, the user can see nearby objects.

B-2. Method of Capturing a Three-Dimensional Whole-Sky Image

In a case where a three-dimensional image for whole-sky display is to be captured, if partial zooming is performed, a backdrop-like image is observed as if the user were using a telescope. This is because the inter-viewpoint distance is fixed. Therefore, on the side of the mobile apparatus 120, imaging is performed while a stereo camera that can move the inter-viewpoint distance between the right and left cameras is made to move the inter-viewpoint distance in accordance with the magnification of the zooming, so as to obtain a natural three-dimensional whole-sky image. Alternatively, in a case where the inter-viewpoint distance between the left-eye camera and the right-eye camera is fixed, the mobile apparatus 120 or the head mount display 110 may perform image processing so as to widen the viewpoint, such as extrapolating the outside of the viewpoints of the cameras.

Figure 13A:
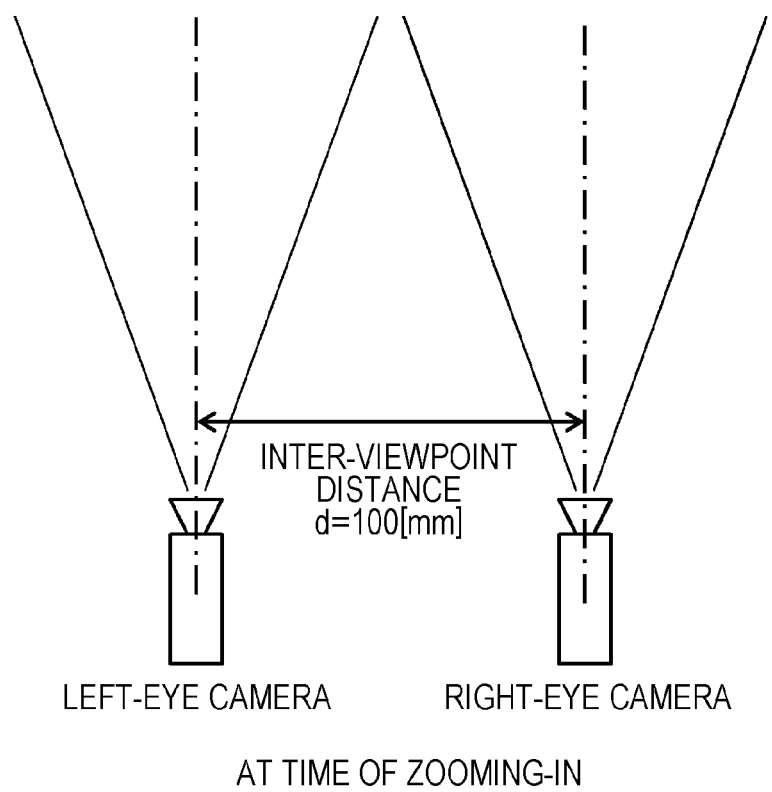
FIG. 13A is a diagram for explaining a method of capturing a three-dimensional image while varying an inter-viewpoint distance d in accordance with a zooming operation.
Figure 13B:
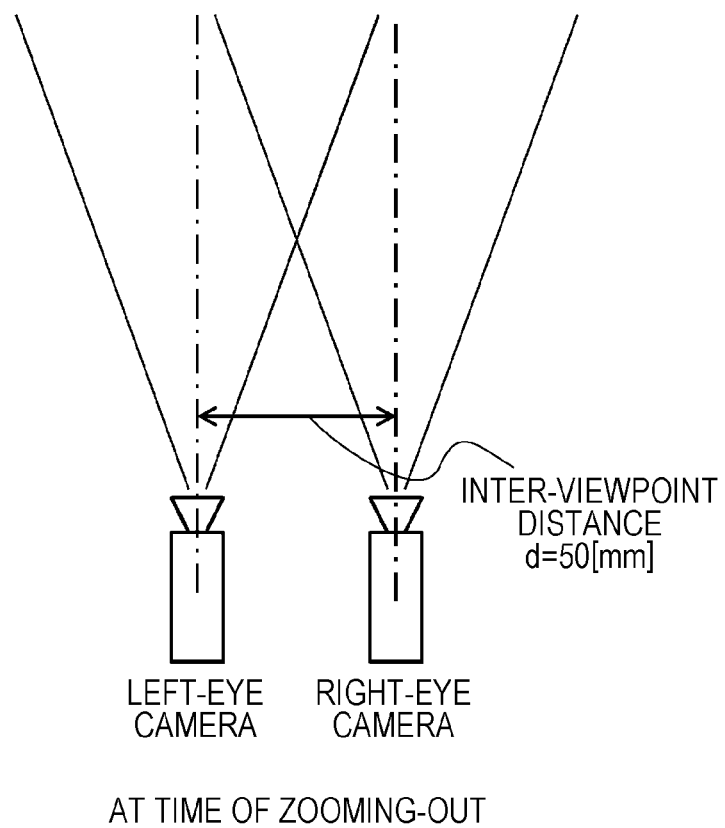
FIG. 13B is a diagram for explaining the method of capturing a three-dimensional image while varying the inter-viewpoint distance d in accordance with a zooming operation.

Specifically, on the side of the mobile apparatus 120, the stereo camera is designed to be capable of moving 50 to 100 mm, which is the inter-viewpoint distance d between the left-eye camera and the right-eye camera (see FIG. 13A). The inter-viewpoint distance is increased at a time of zooming-in, but is reduced at a time of zooming-out. Where the stereo camera is installed, this situation is created by making the inter-viewpoint distance variable with zooming. FIG. 13B shows a situation where the inter-viewpoint distance d between the left-eye camera and the right-eye camera is shortened to 50 mm when zooming-out is performed. In this situation, the head mount display 110 or the controller 130 might directly control the camera unit 605 so that a three-dimensional image is viewed in real time. Alternatively, images captured with different inter-viewpoint distances are recorded, and the inter-viewpoint distance of the image to be reproduced is changed in synchronization with the zooming operation at the time of viewing. Also, at the time of viewing, an image with an intermediate inter-viewpoint distance may be generated through image processing in synchronization with zooming.

In a case where the inter-viewpoint distance of the stereo camera is fixed, viewpoint images with different inter-viewpoint distances are combined through image processing, and the image being reproduced is switched to the combined image in synchronization with zooming. In this manner, zooming as natural as viewpoint motion can be performed.

When a three-dimensional whole-sky image captured on the side of the mobile apparatus 120 is viewed with the head mount display 110, the viewpoint motion effect can be achieved by changing the inter-viewpoint distance between the right and left images being displayed. However, a three-dimensional motion parallax effect with viewpoint motion is not achieved. So as to achieve a three-dimensional motion parallax effect, parallaxes need to be generated by some other means such as image processing, with motion parallaxes being taken into consideration.

B-3. Interaction Between the Posture of the Head of a User and a Captured Image

Figure 14:
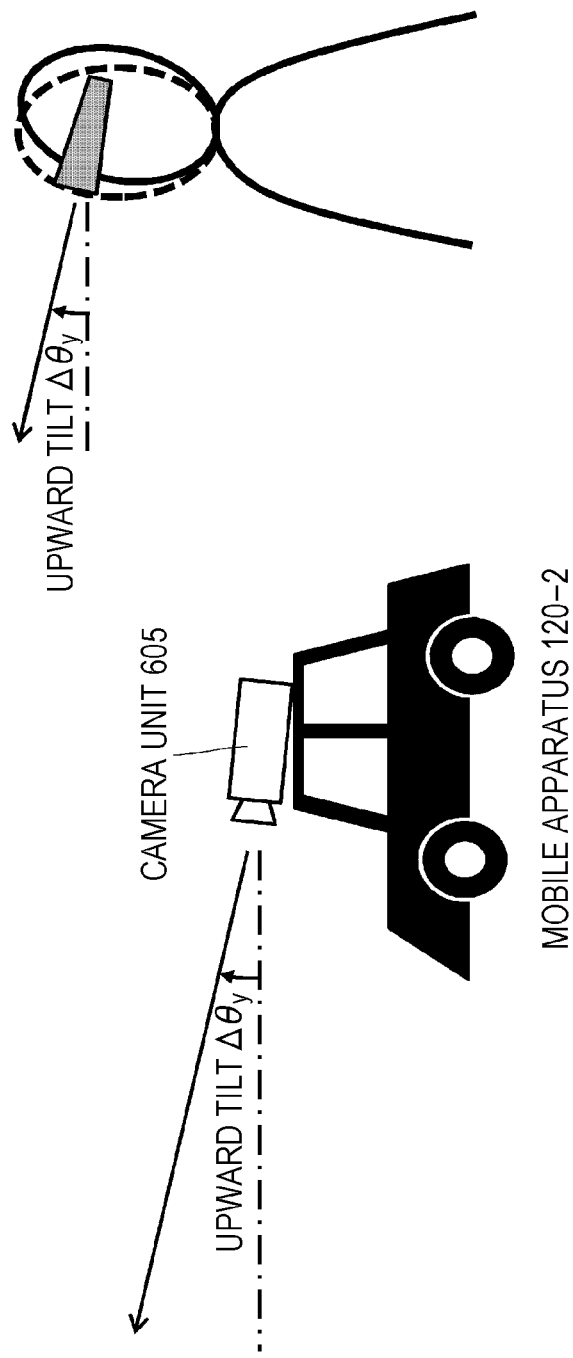
FIG. 14 is a diagram showing a situation where the head is tilted upward, and the camera unit 605 mounted on a mobile apparatus 120-2 is also tilted upward.

In a case where the coordinate system of panning, tilting, and rolling of the head of a user (see FIG. 5) is matched with the coordinate system of panning, tilting, and rolling of the camera unit 605 (see FIG. 8A), an image of the display field that follows motion of the head of the user facing forward shows a lower side while the mobile apparatus 120 is moving. For example, in the case of the mobile apparatus 120-2 that is an automobile, only the ground surface is shown. Therefore, so as to obtain an image of the scenery ahead of the mobile apparatus 120-2, the user needs to tilt his/her head in the upward direction and tilt the camera unit 605 mounted on the mobile apparatus 120-2 also in the upward direction (see FIG. 14). However, if the user continues to look upward while the mobile apparatus 120-2 is moving, the neck of the user will be tired.

To counter this problem, the axis of tilt of the camera unit 605 mounted on the mobile apparatus 120-2 can be secured in a position that is offset upward by $\Delta\theta_y$ from the axis of tilt of the head of the user.

Figure 15:
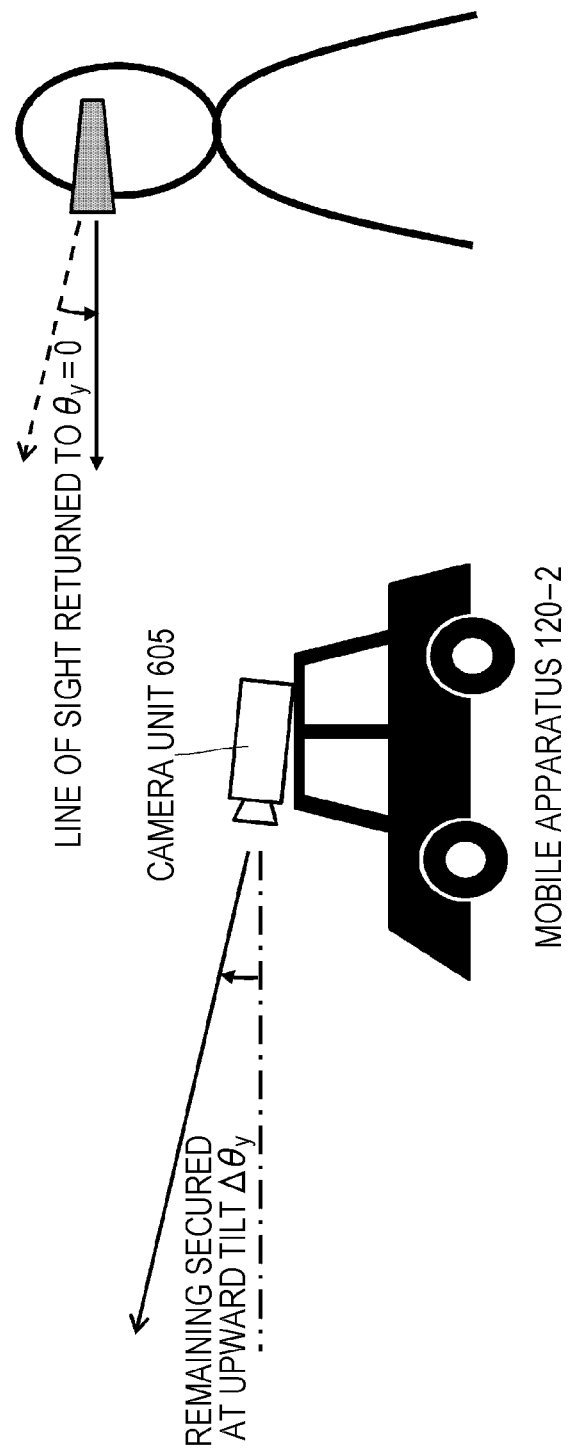
FIG. 15 is a diagram showing a situation where the axis of tilt of the camera unit 605 mounted on the mobile apparatus 120-2 is secured in a position that is rotated upward by $\Delta\theta_y$ from the axis of tilt of the head of the user.

For example, where the user is wearing the head mount display 110 and is looking upward at a desired angle $\Delta\theta_y$, $\Delta\theta_y$ offsetting of the axis of tilt of the camera unit 605 may be requested through the input operating unit 403. As shown in FIG. 15, even if the user again faces forward after requesting the $\Delta\theta_y$ offsetting, the posture of the camera unit 605 that interacts with the head of the user remains secured in the position that is offset in the upward tilting direction by $\Delta\theta_y$.

Alternatively, a $\Delta\theta_y$ offsetting instruction for the axis of tilt of the camera unit 605 may be transmitted from the head mount display 110 to the mobile apparatus 120 directly or via the controller 130. In this case, on the side of the mobile apparatus 120, a coordinate system offsetting process is performed on the camera platform 606, for example. With the axis of tilt being offset, a captured image that follows motion of the head of the user is clipped and displayed.

Alternatively, instead of transmission of a coordinate system offsetting instruction to the mobile apparatus 120, internal processing in the head mount display 110 can realize the same process as above. For example, in response to a $\Delta\theta_y$ offsetting instruction for the axis of tilt from the user, the display field control unit 701 sets a display field that is offset in the upward tilting direction by $\Delta\theta_y$ from the axis of tilt of the line of sight of the user detected by the posture/location detecting unit 404.

Figure 16:
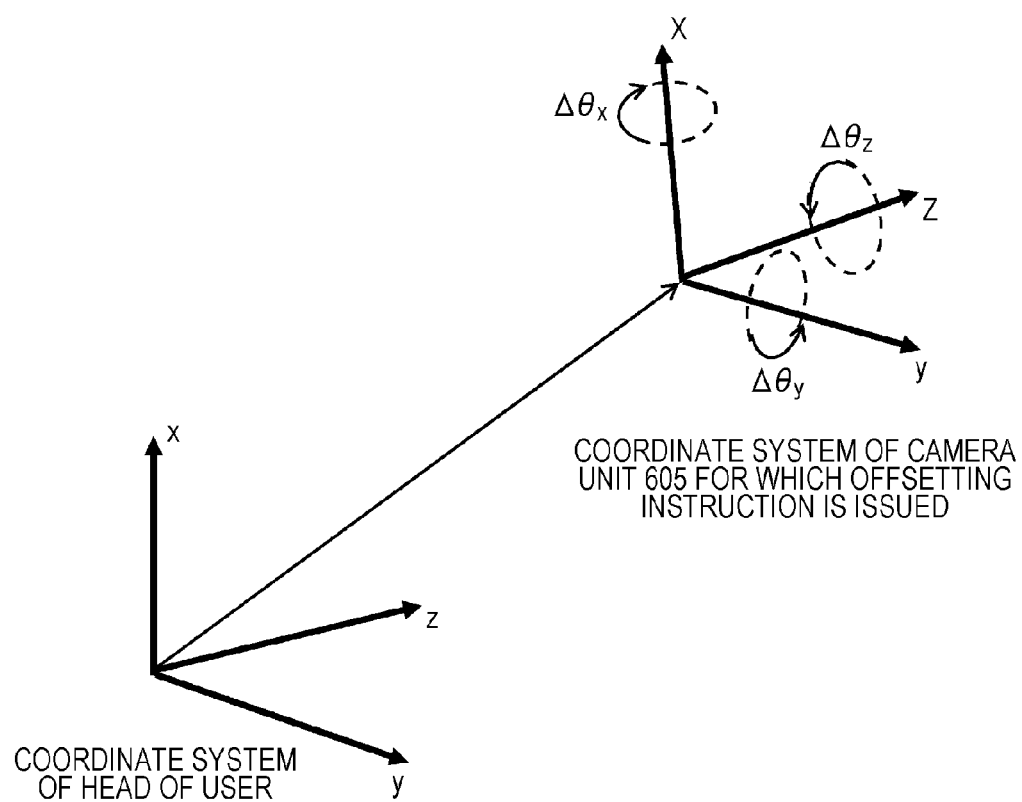
FIG. 16 is a diagram showing a situation where the coordinate system of the camera unit 605 is offset in the respective directions of panning, tilting, and rolling with respect to the coordinate system of the head of the user.

The axis of tilt of the camera unit 605 can of course be offset by $\Delta\theta_y$ not only in the upward direction but also in the downward direction. Likewise, $\pm\Delta\theta_x$ offsetting in the panning direction or $\pm\Delta\theta_z$ offsetting in the rolling direction (see FIG. 16) can be performed so that a captured image that follows motion of the head of the user is clipped and displayed.

In a case where a mobile apparatus 120 becomes unable to operate the controller 130, such as when the mobile apparatus 120-2 as a race car goes spinning out of control while running, if an image captured by the camera unit 605 that is also spinning is displayed on the side of the head mount display 110 in real time, the scenery being displayed changes rapidly, and makes the user's head spin, though the user has not moved his/her line of sight. Therefore, the coordinate system of the camera unit 605 is designed so that the captured image does not change rapidly, regardless of motion of the head of the user. Alternatively, an image captured at some point (for example, immediately after a start of spinning) is saved, and a display switching process that follows motion of the line of sight of the user may be performed on the basis of the coordinate system of the camera unit 605 at the time.

B-4. Feedback to the User

As described above, the head mount display 110 includes the operational feeling feedback unit 412 that gives operational feeling feedback to the user through tactile sensation or vibration. The head mount display 110 is a device to be worn by a user, and can give tactile sensation or vibration as effective feedback directly to the user Meanwhile, each mobile apparatus 120 is equipped with an acceleration sensor as the location/posture/velocity detecting unit 604, and can detect oscillation and impact to which the apparatus is subjected while flying, running, or sailing.

In view of this, while displaying an image captured on the side of the mobile apparatus 120, the head mount display 110 constantly monitors the value detected by the acceleration sensor of the mobile apparatus 120, and instructs the operational feeling feedback unit 412 to output feedback in accordance with the oscillation and impact to which the mobile apparatus 120 is subjected.

When the mobile apparatus 120 collides with obstacle that does not exist in the real word but is displayed in AR by the image combining unit 703, the operational feeling feedback unit 412 is also instructed to output feedback in accordance with the virtual impact.

B-5. AR Image Display

In conventional FPV, an image captured by a camera mounted on a radio-controlled model is displayed as it is. In this embodiment, on the other hand, the head mount display 110 superimposes a non-existent AR image on an image captured on the side of a mobile apparatus 120, and then displays the superimposed image.

In the case of the mobile apparatus 120-1 that is a flying object such as an aircraft or a helicopter, an AR image of a pylon or the like is superimposed on the captured image to be displayed. In the case of the mobile apparatus 120-2 for traveling on land such as an automobile (a race car), an AR image of a race course such as a circuit is superimposed on the captured image to be displayed. In the case of the mobile apparatus 120-3 that is a watercraft such as a yacht, an AR image of a buoy is superimposed on the captured image to be displayed.

Figure 28:
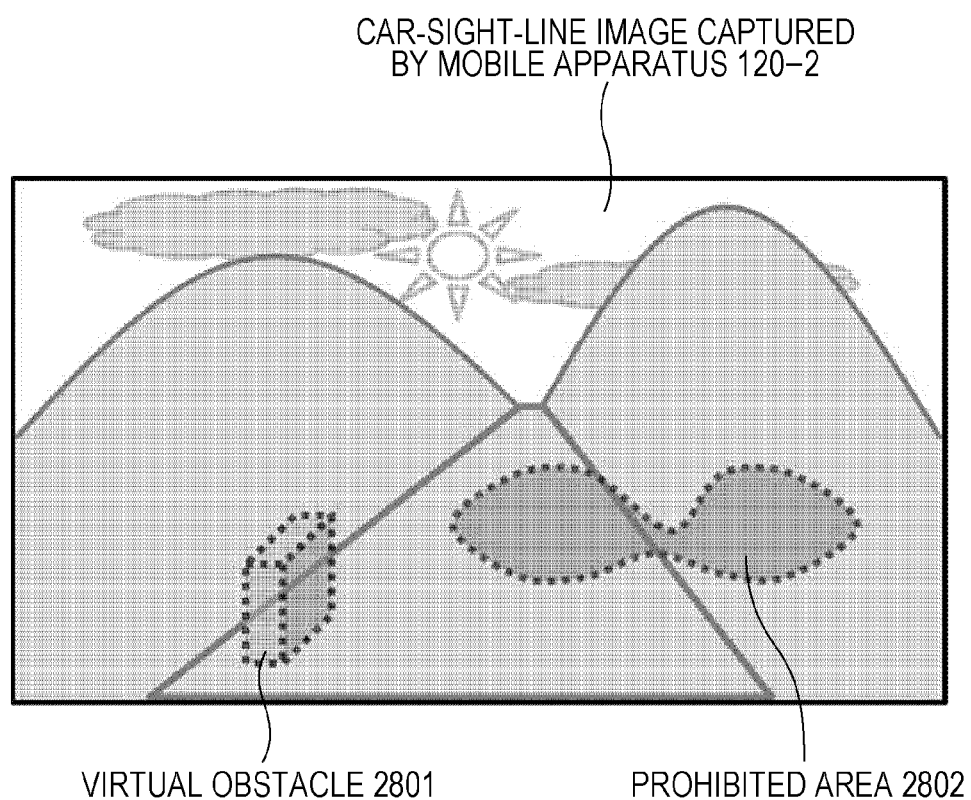
FIG. 28 is a diagram showing a situation where AR images of virtual obstacle 2801 and a prohibited area 2802 are displayed on a car-sight-line image (the real word) captured by the mobile apparatus 120-2.

In a case where the site of an AR image is registered in advance, the head mount display 110 constantly monitors the current location of the mobile apparatus 120 while displaying a captured image. When the mobile apparatus 120 reaches the site (or the site is shown in the captured image), an AR image display process starts. Not only a guidepost for movement of the mobile apparatus 120 such as a pylon or a buoy, but also virtual obstacle that hinders movement of the mobile apparatus 120 or a prohibited area such as an area dangerous for the mobile apparatus 120 to pass through or the premises of other people can be shown in an AR image. FIG. 28 shows a situation where AR images of virtual obstacle 2801 and a prohibited area 2802 are displayed on a car-sight-line image (the real word) captured by the mobile apparatus 120-2.

In a case where an object to be displayed in an AR image is registered in advance, the head mount display 110 recognizes objects shown in a captured image sent from the mobile apparatus 120. When the registered object is found, the AR image display process is started. The registered object may be a product, a person, a pet animal, a plant, a building, or the like the user is looking for.

An AR image of an object is displayed in a case where a product or the like the user is looking for is emphasized, or where the object (that should be hidden from the user) is erased from the screen.

In a case where an AR image display state is registered in advance, the head mount display 110 monitors the current state of the mobile apparatus 120. When the mobile apparatus 120 enters the state registered beforehand, the AR image display process is started. An example of the state mentioned above is a state where the radio waves received from the controller 130 become weaker, and control cannot be performed. In such a case, the area where the radio waves cannot be received is set as a "prohibited area", and guidance for preventing the mobile apparatus 120 from entering the prohibited area is displayed as an AR image. In an operation of the image display system 100, it is of course possible to provide actual guidance such as a signboard indicating the prohibited area.

Furthermore, if the mobile apparatuses 120 are located in the same positions, are the same objects, or are in the same state, different AR images may be displayed in accordance with the characteristics (age, nationality, sex, personality, or the like) of the respective users or the skills of the respective users operating the mobile apparatuses 120. For example, it is expected that different AR images are required for an adult user and a child user. Also, it is preferable to display an AR image to a beginner sooner than to a highly-skilled person.

B-6. Display of Relative Location of the User

In the image display system 100 according to this embodiment, a user can observe a captured image with the head mount display 110 while moving a mobile apparatus 120 by operating the controller 130. The user can enjoy the scenery of a faraway place to which the mobile apparatus 120 has moved, though the user has not moved at all.

In doing so, the user can recognize the place of the imaging by monitoring the location information that is output from the location/posture/velocity detecting unit 604 of the mobile apparatus 120. However, even if the user wishes to go to the place, he/she cannot instantly decide which direction to go simply by looking at a captured image.

In view of this, the head mount display 110 can display an AR image indicating the positional relationship between the user and the mobile apparatus 120 in a captured image sent from the mobile apparatus 120. As the head mount display 110 displays the location information about the user, the user can obtain a navigation function as well as enjoying FPV.

The display image of the positional relationship can be generated in the head mount display 110 by the image combining unit 703 based on the location information about the user detected by the location/posture detecting unit 404, and the location information about the mobile apparatus 120 detected by the location/posture/velocity detecting unit 604 of the mobile apparatus 120.

In a case where the location information about the user is displayed, for example, the location information about the user may be displayed as a small screen in the screen displaying an image captured by the mobile apparatus 120, as shown in FIG. 17. The small screen shows a map image, for example, and respective icons indicating the current location of the mobile apparatus 120 and the current location of the user are shown in the image. Alternatively, depending on a user operation through the input operating unit 402, the location information about the user may be displayed on the large screen, and a captured image may be displayed on the small screen, as shown in FIG. 18.

Figure 18:
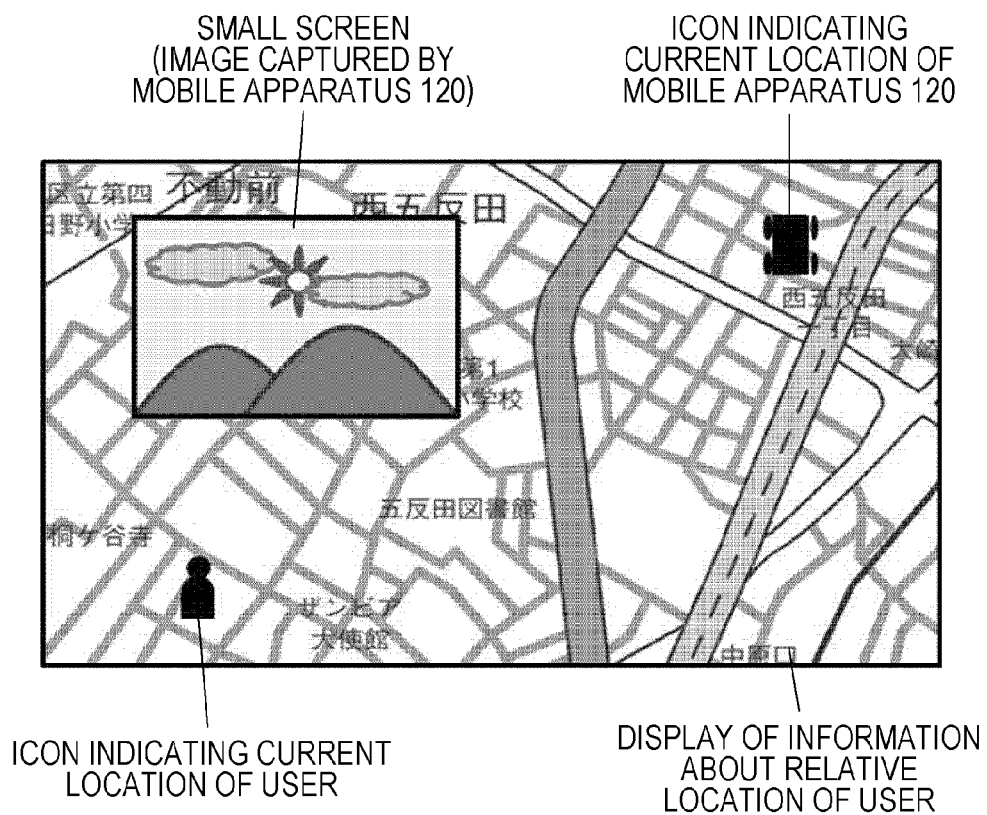
FIG. 18 is a diagram showing a situation where location information about a user is displayed on a large screen, and a captured image is displayed on a small screen.
Figure 19:
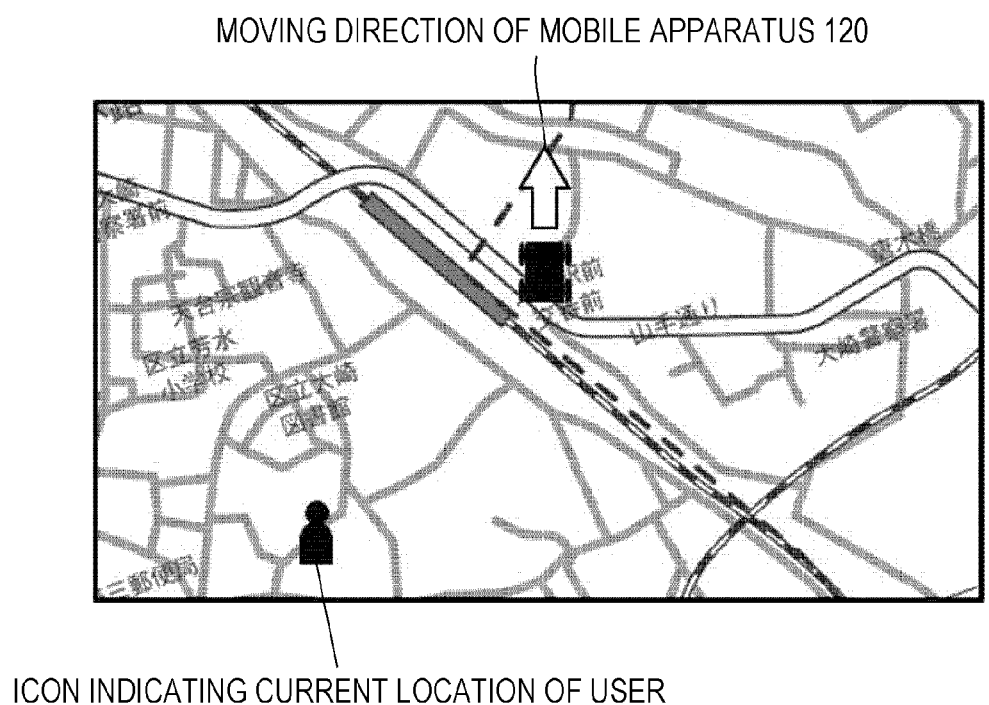
FIG. 19 is a diagram showing an example of display of location information about a user.
Figure 20:
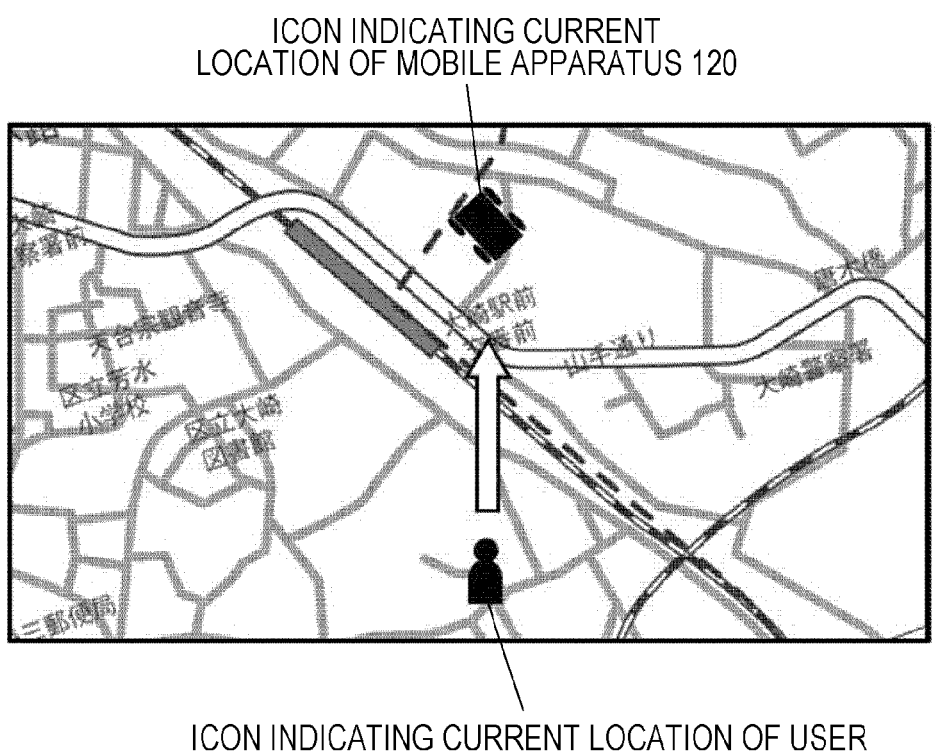
FIG. 20 is a diagram showing an example of display of location information about a user.

In a case where the location information about the user is displayed, north is located on the upper side as shown in FIGS. 17 and 18 (North Up), the mobile apparatus 120 is moving upward on the display as shown in FIG. 19, or the line of sight of the user is in the upward direction on the display as shown in FIG. 20. The moving direction of the mobile apparatus 120 can be detected by the location/posture/velocity detecting unit 604. The direction of the line of sight of the user can be detected by the posture/location detecting unit 404 or the state detecting unit 411.

In each of the examples shown in FIGS. 17 through 20, the user and the mobile apparatus 120 are placed on the map screen, so that the respective absolute locations can be displayed. However, the map screen may not be used, and the relative locations of the user and the mobile apparatus 120 may be displayed.

In a case where the mobile apparatus 120 is a submarine or the like that travels under water, it might be difficult to receive GPS signals. Therefore, absolute location information may be acquired by a substitute means such as underwater acoustic communication.

B-7. Automatic Tracking of a Mobile Apparatus

In the above described embodiments, so-called FPV (first-person viewpoint image) captured by a mobile apparatus 120 is displayed on the head mount display 110 and is enjoyed. Some users wish to enjoy scenery including a mobile apparatus 120.

In view of this, an automatic tracker that tracks the rear (or a side) of a mobile apparatus 120 may be provided, and an image captured by the automatic tracker may be displayed on the head mount display 110.

Figure 21:
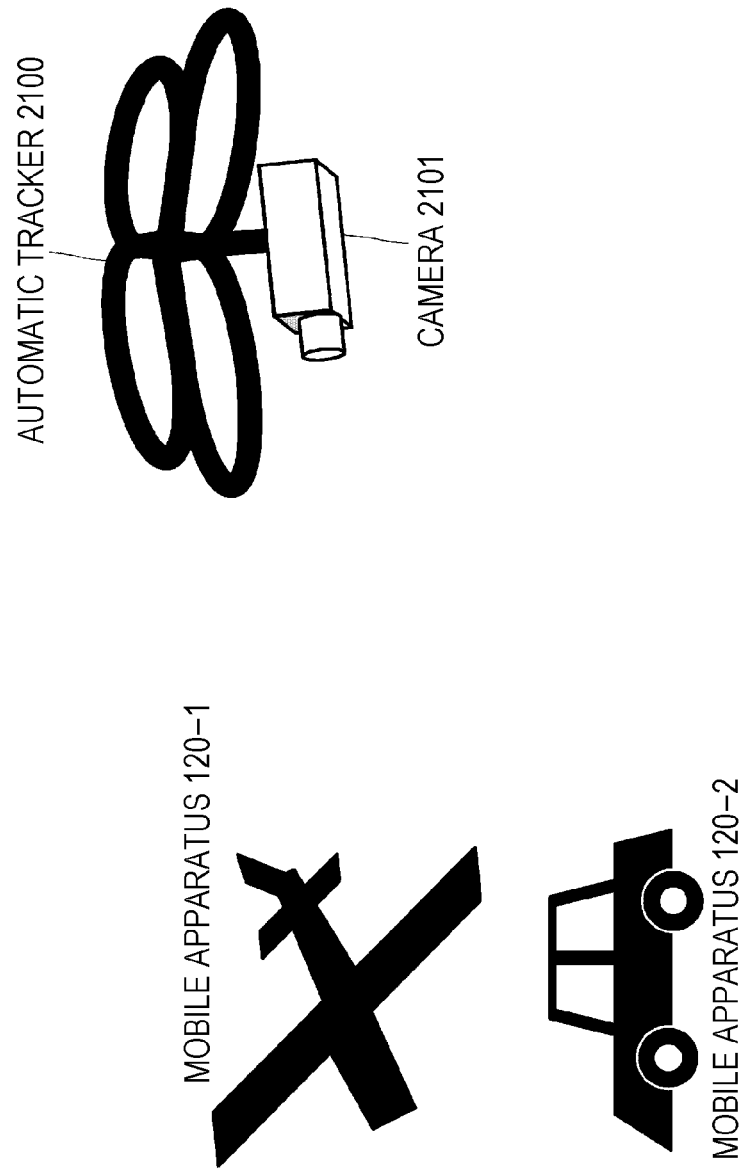
FIG. 21 is a diagram showing a situation where an automatic tracker 2100 equipped with a camera 2101 is tracking the rear of a mobile apparatus 120-1 flying in the air.
Figure 22:
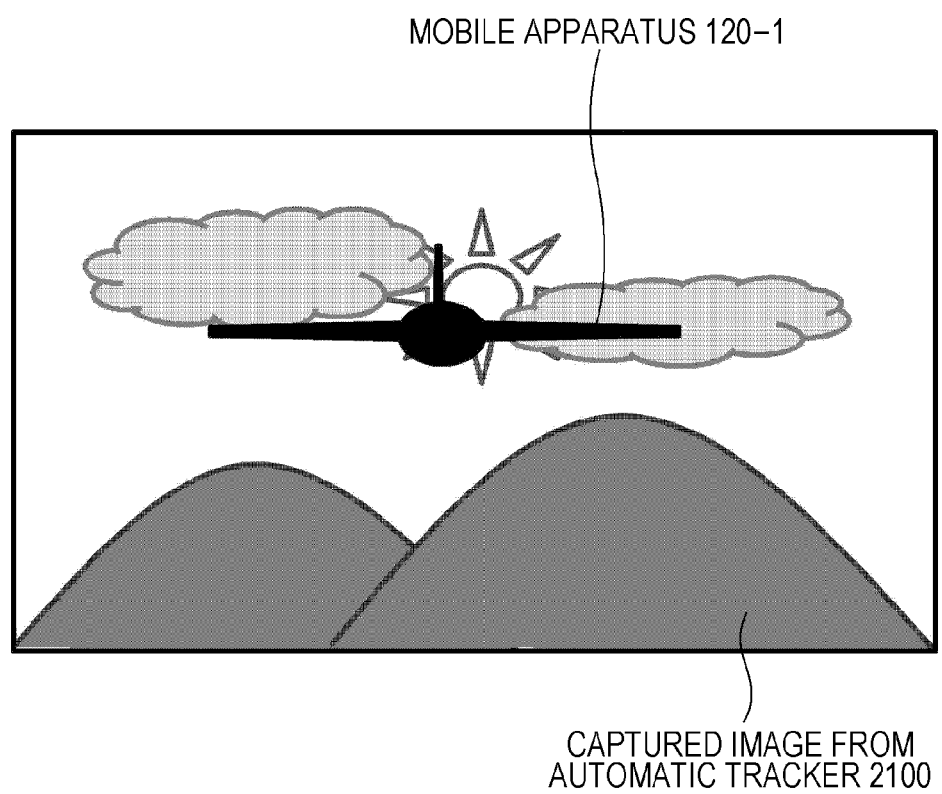
FIG. 22 is a diagram showing an example of an image of the mobile apparatus 120-1 captured from behind by the camera 2101 of the automatic tracker 2100.

FIG. 21 shows a situation where an automatic tracker 2100 equipped with a camera 2101 is tracking the rear of the mobile apparatus 120-1 flying in the air or the mobile apparatus 120-2. FIG. 22 shows an example of an image of the mobile apparatus 120-1 captured from behind by the camera 2101 of the automatic tracker 2100.

The automatic tracker 2100 may not fly as shown in FIG. 21, and lower costs can be realized by employing a secondary camera that captures images of a mobile apparatus 120 from behind as shown in FIG. 8C.

B-8. Screen Switching

In the above described embodiments, an image of the scenery of a remote place captured by a mobile apparatus 120 (or an image captured by the automatic tracker 2100) is displayed on the head mount display 110 and is enjoyed.

Meanwhile, the external camera 413 is placed at almost the center of the front surface of the main frame of the head mount display 110 having an eyeglass-like shape or a hat-like shape (see FIG. 2), and can capture images of the surroundings. Also, posture control in the panning, tilting, and rolling directions of the external camera 413 is performed in accordance with the direction of the user's line of sight detected by the state information detecting unit 411, so that an image on the level of the user's line of sight can be captured with the external camera 413.

Figure 23:
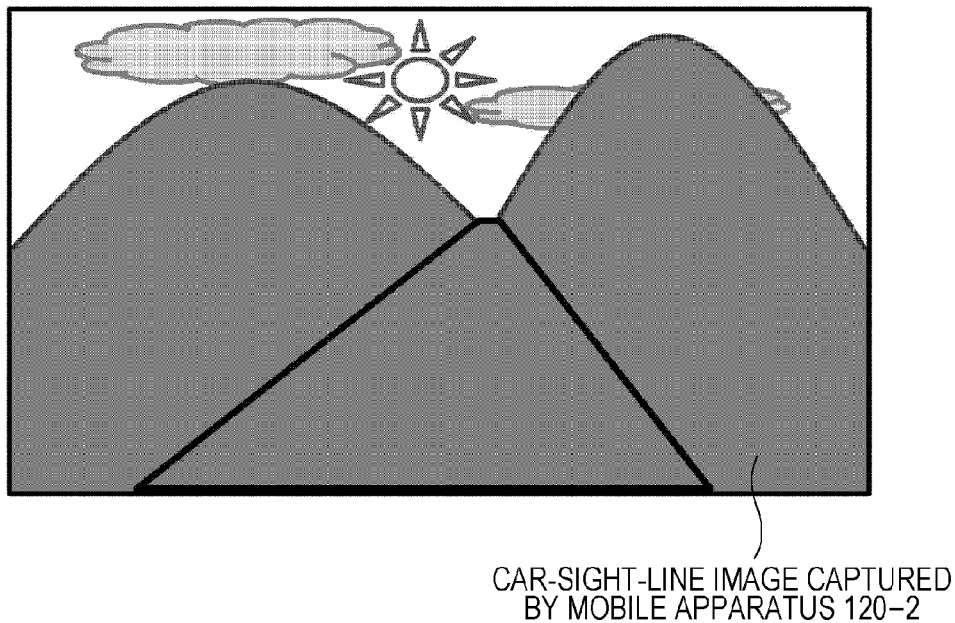
FIG. 23 is a diagram showing an example of a car-sight-line image captured by the mobile apparatus 120-2 as an automobile.
Figure 24:
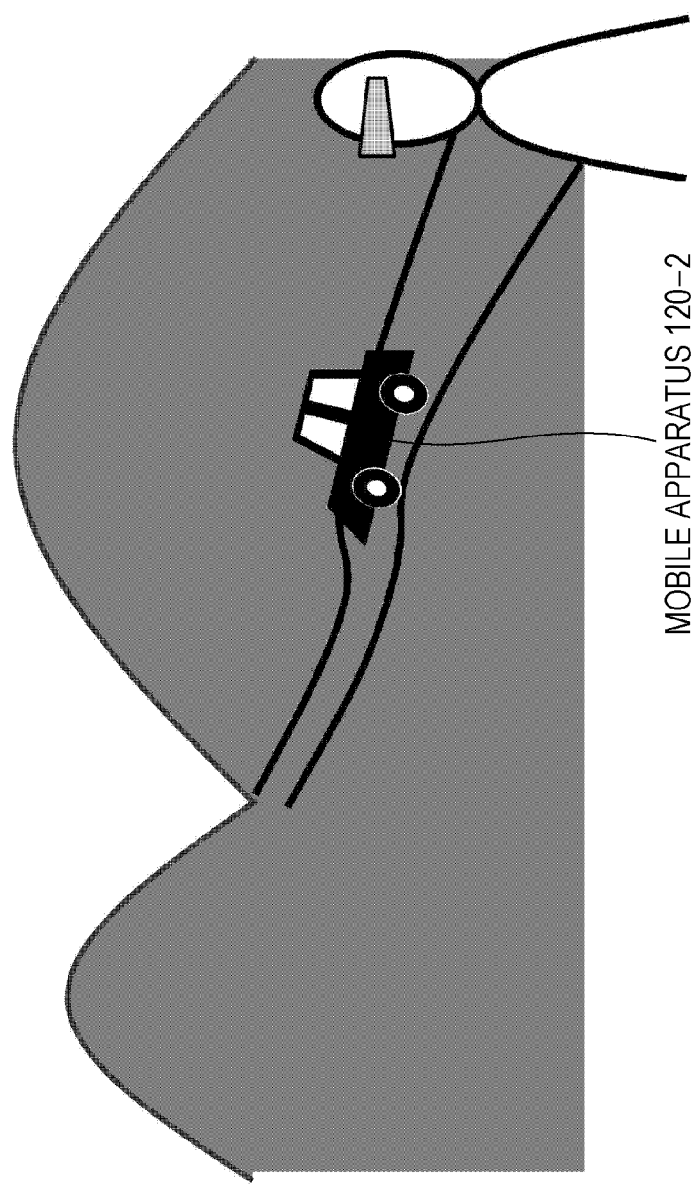
FIG. 24 is a diagram showing an example of a situation where a user wearing the head mount display 110 follows a running mobile apparatus 120-3 with his/her eyes.
Figure 25:
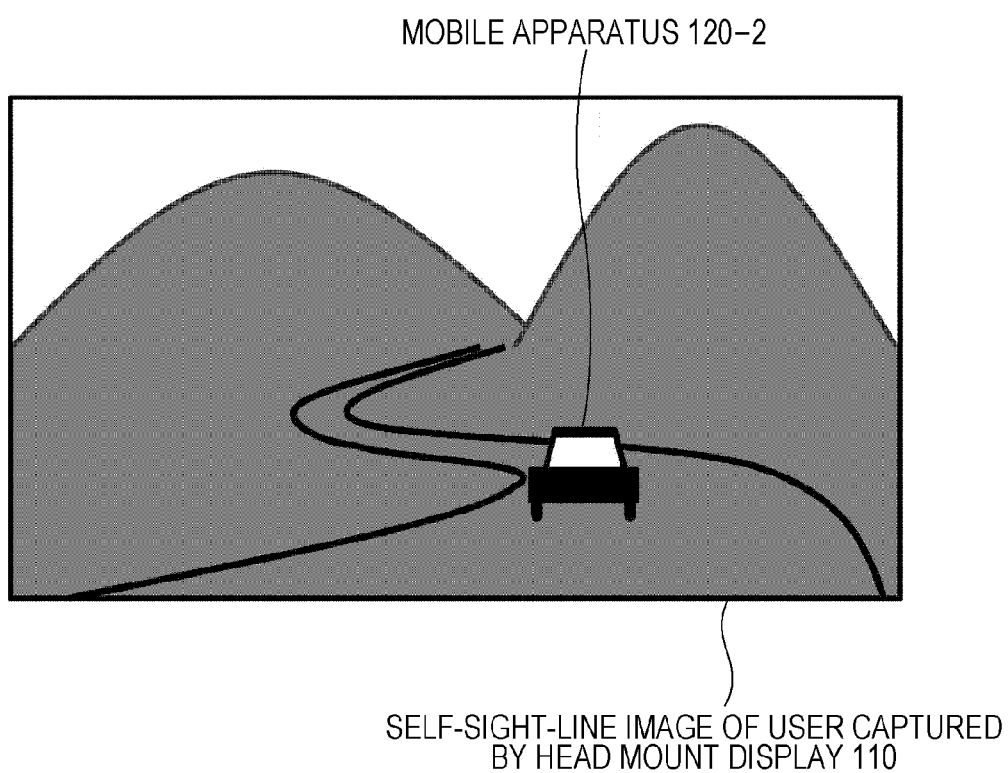
FIG. 25 is a diagram showing an example of a self-sight-line image of a user who is following the mobile apparatus 120-3 with his/her eyes, the self-sight-line image being captured by an external camera 413.

In view of this, the screen of the display panel 409 may be switched between an image captured by a mobile apparatus 120 and an image captured by the external camera 413 in accordance with a user operation or the like through the input operating unit 402. FIG. 23 shows an example of a car-sight-line image captured by the mobile apparatus 120-2 as an automobile. FIG. 24 shows an example of a situation where a user wearing the head mount display 110 follows the running mobile apparatus 120-3 with his/her eyes. FIG. 25 shows an example of a self-sight-line image of the user who is following the mobile apparatus 120-3 with his/her eyes. The self-sight-line image is captured by the external camera 413.

The camera unit 605 mounted on a mobile apparatus 120 is at least a single camera, and basically performs imaging from the first-person viewpoint of the operator. However, the camera unit 605 may further include cameras that perform imaging from other viewpoint positions.

For example, the mobile apparatus 120-2 as an automobile is equipped with cameras that include a camera that captures an image on the line of sight of a car in front in the traveling direction, a camera that captures images of scenery reflected by the right and left sideview mirrors, a camera that captures an image of scenery reflected by the rearview mirror, and a camera that captures an image of scenery reflected when the user looks at meters and gauges. Alternatively, the mobile apparatus 120-2 may be equipped with a single camera, but the camera platform 606 may move the viewpoint position of the camera.

Figure 26:
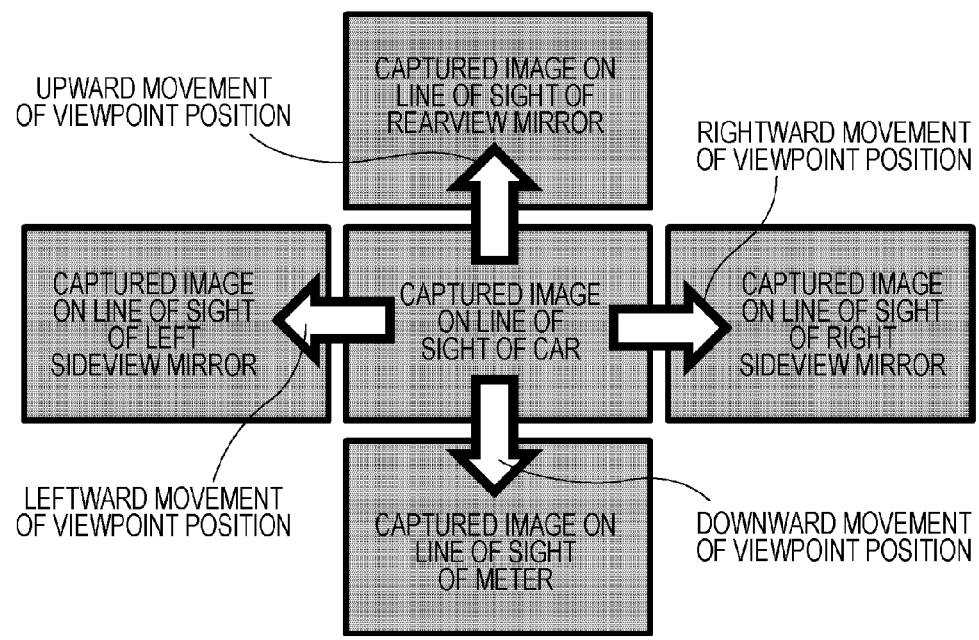
FIG. 26 is a diagram showing an example layout of images captured by a mobile apparatus 120 in different viewpoint positions.

In this case, images captured by the cameras of the respective viewpoint positions are arranged as shown in FIG. 26, for example. In the example shown in the drawing, a captured image on the line of sight of the car is placed at the center, captured images on the lines of sight of the right and left sideview mirrors are placed to the right and left of the car-sight-line image, an image on the line of sight of the rearview mirror is placed above the car-sight-line image, and a capture image on the line of sight of an eye looking at the meters and gauges is placed below the car-sight-line image. On the side of the head mount display 110, the display field is not moved in accordance with motion of the head of the user, but the image displayed on the display panel 409 is switched to the left-sideview-mirror sight-line image when the head turns to the left, is switched to the right-sideview-mirror sight-line image when the head turns to the right, is switched to the rearview-mirror sight-line image when the head tilts upward, and is switched to the meter sight-line image when the head tilts downward. When the head of the user again faces forward, the image displayed on the display panel 409 is returned to the car-sight-line image.

B-9. Image Correction

Figure 27:
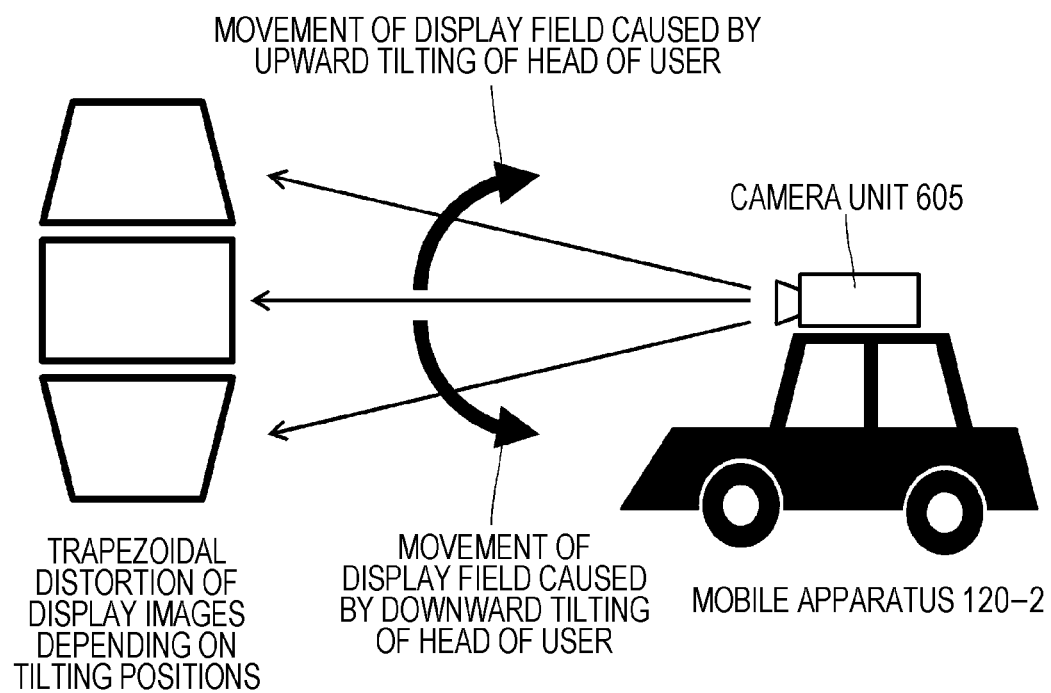
FIG. 27 is a diagram showing a situation where observed images have trapezoidal distortion in accordance with upward and downward tilting of the head of a user.

In a case where a wide-angle captured image such as a whole-sky image is being viewed in a narrow display field, when the user tilts his/her head, the display field control unit 701 moves the display field upward or downward in accordance with the tilting, and the image clipping unit 702 clips a display image in the moved display field (see FIG. 9). When the user tilts his/her head upward and moves the display field upward, the distance from the projecting plane is longer at the upper edge of the display field. Therefore, the display image has a trapezoidal shape with a shorter upper edge than the upper edge of the display frame of the display panel 409. Likewise, when the user tilts his/her head downward, the distance from the projecting plane is longer at the lower edge of the display field. Therefore, the display image has a trapezoidal shape with a shorter lower edge than the lower edge of the display frame of the display panel 409 (see FIG. 27). A trapezoidal image causes a feeling of strangeness in the user, who is viewing the image.

In view of this, the image combining unit 703 performs trapezoidal distortion correction so that the image being viewed by the user always has a rectangular shape.

B-10. Image Stabilizing Process

In the case of the mobile apparatus 120-2 as an automobile, for example, a captured image might shake vertically or horizontally due to the influence of uneven road surface on which the mobile apparatus 120-2 is running. In the case of the mobile apparatus 120-1 as a flying object such as an aircraft or a helicopter, a captured image might shake horizontally due to the influence of an airstream or the like. In the case of the mobile apparatus 120-3 as a watercraft such as a yacht, a captured image shakes due to the influence of a stream or waves while sailing.

When a person is watching an image that is shaking, the person feels as if he/she were getting seasick. In general, erratic shaking with slow waves and large amplitude easily makes a person feel sick.

When there is shaking in an image captured by a mobile apparatus 120, the image may be displayed only after the shaking is canceled on the side of the head mount display 110.

When erratic shaking with slow waves and large amplitude is detected by monitoring the value detected by the acceleration sensor on the side of the mobile apparatus 120, for example, an image shaking correction process is started on the side of the head mount display 110.

For example, the display field control unit 701 inputs the value detected by the acceleration sensor on the side of the mobile apparatus 120, adds the detected value to the posture information about the head of the user, determines the position and the posture of the display field so as to cancel the shaking in the mobile apparatus 120, and outputs the position and the posture to the image clipping unit 702.

Alternatively, the image clipping unit 702 inputs the value detected by the acceleration sensor on the side of the mobile apparatus 120, corrects the position and the posture of the display field determined by the display field control unit 701 based on the posture information about the head of the user so as to cancel the shaking in the mobile apparatus 120, and clips an image in the display field from a captured image.

The image combining unit 703 or the like can perform the shaking correction process by turning a motion image into a slow-motion image or performing frame thinning. In a case where a motion image is turned into a slow-motion image, only the portions with motion in the frames may be turned into slow-motion image portions.

In the shaking correction process, shaking may be prevented not by performing the above described image processing but by reducing the screen size only while shaking is being detected in the mobile apparatus 120, with attention being paid to the fact that a person easily feels sick with a large screen. The virtual image optical unit 410 forms an enlarged virtual image of an image displayed on the display panel 409, as described above. The virtual image optical unit 410 may adjust magnification, or the display panel 409 may reduce the display size.

The optical system of the camera unit 605 may of course be provided on the side of the mobile apparatus 120, or image processing may of course have a shaking correcting function.

C. Recapitulation

The technology disclosed in this specification may be embodied in the structures described below.

(1) An image display apparatus including:
a display unit mounted on the head of a user;
a posture detecting unit that detects posture of the head; and
a display control unit that controls display of an image on the display unit based on the posture of the head, the image being captured by a mobile apparatus.

(2) The image display apparatus of (1), wherein the display control unit clips a region corresponding to the posture of the head from a wide-angle image captured by the mobile apparatus, and displays the clipped region on the display unit.

(3) The image display apparatus of (1), wherein, when displaying a plurality of viewpoint images captured at a plurality of viewpoints by a deep focus parallel method, the display control unit adjusts the convergence point between the viewpoint images based on the movement velocity of the moving object.

(4) The image display apparatus of (1), wherein the display control unit displays an image with an inter-viewpoint distance corresponding to a zooming operation on the display unit.

(5) The image display apparatus of (1), wherein the direction of the line of sight of a camera unit of the mobile apparatus is offset in at least one of the directions of panning, tilting, and rolling with respect to the posture of the head.

(6) The image display apparatus of (1), further including
an operational feeling feedback unit that feeds back an operational feeling to the user through tactile sensation or vibration,
wherein the feedback to the user is based on the acceleration to which the mobile apparatus is subjected while moving.

(7) The image display apparatus of (1), wherein the display control unit superimposes an AR image on a real-world image captured by the mobile apparatus, before displaying the image.

(8) The image display apparatus of (7), wherein the display control unit displays the AR image corresponding to at least one of the current location of the mobile apparatus, an object included in the captured image, and the state of the mobile apparatus.

(9) The image display apparatus of (1), wherein the display control unit displays location information about the mobile apparatus and the user.

(10) The image display apparatus of (1), wherein the display control unit further displays an image captured by an automatic tracker that captures the image while tracking the mobile apparatus.

(11) The image display apparatus of (1), further including
a self-sight-line image acquiring unit that acquires a self-sight-line image to be seen on the line of sight of the user,
wherein the display control unit switches the image being displayed between a moving-object sight-line image captured by the mobile apparatus and the self-sight-line image.

(12) The image display apparatus of (1), wherein the display control unit switches the image being displayed between images captured from a plurality of viewpoint positions of the mobile apparatus in accordance with the posture of the head.

(13) The image display apparatus of (1), wherein the display control unit corrects shaking in a moving image captured by the mobile apparatus, before displaying the moving image.

(14) An image display method including:
a posture detecting step of detecting posture of the head of a user; and
a display control step of controlling display of an image based on the posture of the head, the image being captured by a mobile apparatus.

(15) An image display system including:
a mobile apparatus that captures an image while moving; and
an image display apparatus that displays the image captured by the mobile apparatus in accordance with posture of the head of a user.

(16) A mobile apparatus including:
a camera unit;
a camera platform that controls the direction of the line of sight of the camera unit;
a moving unit that moves the apparatus; and
a communication unit that communicates data including an image captured by the camera unit,
wherein the camera unit includes a plurality of cameras that perform imaging by a deep focus parallel method, the cameras having different viewpoints.

(17) The mobile apparatus of (16), which captures a whole-sky image while changing the inter-viewpoint distance between the cameras with different viewpoints.

(18) The mobile apparatus of (16), which extrapolates images outside the viewpoints of the cameras from images captured by the cameras with different viewpoints at a fixed inter-viewpoint distance from each other.

(19) A computer program written in a computer-readable format,
the computer program causing a computer to function as:

a posture detecting unit that detects posture of the head of a user; and a display control unit that controls display of an image based on the posture of the head, the image being captured by a mobile apparatus.

INDUSTRIAL APPLICABILITY

The technology disclosed in this specification has been described in detail, with reference to specific embodiments. However, it is obvious that those skilled in the art can make modifications to and substitutions of the embodiments without departing from the scope of the technology disclosed in this specification.

In this specification, embodiments in which the technology disclosed in this specification is applied to a system formed with a head mount display to be mounted on the head or the face of a user and radio-controlled mobile apparatuses have been mainly described. However, the scope of the technology disclosed in this specification is not limited to the structure of a specific image display apparatus.

For example, the technology disclosed in this specification can also be applied to various types of display systems that display wide-angle images captured by cameras mounted on various types of remotely-controlled mobile apparatuses or cameras mounted on remotely-guided living creatures such as birds, mammals, reptiles, amphibians, fish, insects, in accordance with the direction of the line of sight of a user.

The mobile apparatuses are radio-controlled models of an aircraft, a helicopter, an automobile, a yacht, and the like, but may be actual mobile apparatuses such as an aircraft, a helicopter, an automobile, and a yacht. As long as the postures (panning, tilting, and rolling) of the mounted cameras can be remotely controlled, the mobile apparatuses may not be remotely-operated or remotely-guided. The mobile apparatuses may not be moving objects that are mechanical devices, but may be living moving objects such as human beings or animals.

In short, the technology disclosed in this specification has been described through examples, and the descriptions in this specifications should not be interpreted in a restrictive manner. The claims should be taken into account in understanding the subject matter of the technology disclosed in this specification.

REFERENCE SIGNS LIST

100 Image display system
110 Head mount display
120 Mobile apparatus
130 Controller
201, 202 Microphone
401 Control unit
401A ROM
401B RAM
402 Input operating unit
403 Remote control receiving unit
404 Posture/location detecting unit
405 Communication unit
406 Storage unit
407 Image processing unit
408 Display drive unit
409 Display panel
410 Virtual image optical unit
411 State detecting unit
412 Operational feeling feedback unit
413 External camera
601 Control unit
602 Storage unit
603 Movement mechanism unit
604 Location/posture/velocity detecting unit
605 Camera unit
606 Camera platform
607 Communication unit
701 Display field control unit
702 Image clipping unit
703 Image combining unit

The invention claimed is:

1. A head mount display device, comprising:
circuitry configured to:
detect a posture of a user's head;
control, based on the posture of the user's head, a display unit to display a first image of a first plurality of images,
wherein each of the first plurality of images are captured by a mobile apparatus, and
wherein each of the first plurality of images corresponds to a first geospatial location of the mobile apparatus in a real space;
determine a second geospatial location of the mobile apparatus in the real space,
wherein at least one object is located at the second geospatial location, and
wherein an AR image corresponds to the at least one object; and
control, based on the second geospatial location, the display unit to display a second image such that the AR image is superimposed on the first image.

2. The head mount display device according to claim 1, wherein the circuitry is further configured to:
receive a wide-angle image of the first plurality of images, wherein the wide-angle image corresponds to the first image;
clip, based on the posture of the user's head, a region from the wide-angle image; and
control the display unit to display the clipped region in a display field of the display unit.

3. The head mount display device according to claim 1, wherein the circuitry is further configured to:
adjust a convergence point between a plurality of viewpoint images based on a movement velocity of the mobile apparatus, wherein the plurality of viewpoint images are captured by the mobile apparatus by a deep focus parallel method; and
control the display unit to display the first image based on the plurality of viewpoint images.

4. The head mount display device according to claim 1, wherein the circuitry is further configured to control the display unit to display the first image with an inter-viewpoint distance corresponding to a zooming operation.

5. The head mount display device according to claim 1, wherein a direction of a line of sight of a camera unit of the mobile apparatus is offset in at least one of directions of panning, tilting, or rolling with respect to the posture of the user's head.

6. The head mount display device according to claim 1, wherein the circuitry is further configured to:
communicate an operational feeling feedback to a user based on acceleration of the mobile apparatus in motion,
wherein the operation feeling feedback corresponds to at least one of a tactile sensation or a vibration.

7. The head mount display device according to claim 1, wherein the circuitry is further configured to control the display unit to display the AR image based on a state of the mobile apparatus.

8. The head mount display device according to claim 1, wherein the circuitry is further configured to control the display unit to: display a third image corresponding to current location information of the mobile apparatus and a fourth image corresponding to a location information of the user.

9. The head mount display device according to claim 1, wherein the circuitry is further configured to control the display unit to display a fifth image captured by an automatic tracker, and
wherein the automatic tracker captures the fifth image based on a tracking operation of the mobile apparatus.

10. The head mount display device according to claim 1, wherein the circuitry is further configured to:
acquire a self-sight-line image viewable on a user's line of sight; and
switch the first image between a moving-object sight-line image captured by the mobile apparatus and the self-sight-line image.

11. The head mount display device according to claim 1, wherein the circuitry is further configured to switch, based on the posture of the user's head, the first image between a second plurality of images captured from a plurality of viewpoints of the mobile apparatus.

12. The head mount display device according to claim 1, wherein the circuitry is further configured to:
correct a shake in a seventh image that is captured by the mobile apparatus in motion; and
control the display unit to display the seventh image.

13. An image display method, comprising:
detecting a posture of a user's head;
controlling, based on the posture of the user's head, a display unit to display a first image of a plurality of images,
wherein each of the plurality of images are captured by a mobile apparatus, and
wherein each of the plurality of images corresponds to a first geospatial location of the mobile apparatus in a real space;
determining a second geospatial location of the mobile apparatus in the real space,
wherein at least one object is located at the second geospatial location, and
wherein an AR image corresponds to the at least one object; and
controlling, based on the second geospatial location the display unit to display a second image such that the AR image is superimposed on the first image.

14. An image display system, comprising:
a mobile apparatus in motion configured to capture a plurality of images,
wherein each of the plurality of images corresponds to a first geospatial location of the mobile apparatus in real space; and
a head mount display device configured to:
detect a posture of a user's head;
control, based on the posture of the user's head, a display unit to display a first image of the plurality of images;
determine a second geospatial location of the mobile apparatus in the real space,
wherein at least one object is located at the second geospatial location, and
wherein an AR image corresponds to the at least one object; and
control, based on the second geospatial location, the display unit to display a second image such that the AR image is superimposed on the first image.

15. A mobile apparatus, comprising:
a camera unit comprising a plurality of cameras,
wherein the plurality of cameras are configured to capture a first plurality of images by a deep focus parallel method, and
wherein the plurality of cameras have different viewpoints;
a camera platform configured to control a direction of a line of sight of the camera unit;
a moving device configured to move the mobile apparatus in real space; and
a communication network configured to communicate, a first image of the first plurality of images, to a head mount display device,
wherein each of the first plurality of images corresponds to a first geospatial location of the mobile apparatus in a real space, and
wherein the head mount display device controls, based on a second geospatial location of the mobile apparatus in the real space, a display unit to display a second image such that an AR image is superimposed on the first image,
wherein at least one object is located at the second geospatial location, and
wherein the AR image corresponds to the at least one object.

16. The mobile apparatus according to claim 15, wherein the mobile apparatus is further configured to capture a whole-sky image based on a change of an inter-viewpoint distance between the plurality of cameras.

17. The mobile apparatus according to claim 15, wherein the mobile apparatus is further configured to extrapolate a second plurality of images outside the different viewpoints of the plurality of cameras at a fixed inter-viewpoint distance from the first plurality of images.

18. A non-transitory computer-readable medium having stored thereon, computer-executable, which when executed by a head mount display device, cause the head mount display device to execute operations, the operations comprising:
detecting a posture of a user's head;
controlling, based on the posture of the user's head, a display unit to display a first image of a plurality of images,
wherein each of the plurality of images are captured by a mobile apparatus,
wherein each of the plurality of images corresponds to a first geospatial location of the mobile apparatus in a real space;
determining a second geospatial location of the mobile apparatus in the real space,
wherein at least one object is located at the second geospatial location, and
wherein an AR image corresponds to the at least one object; and
controlling, based on the second geospatial location, the display unit to display a second image such that the AR image is superimposed on the first image.

19. The head mount display device according to claim 1, wherein the circuitry is further configured to periodically monitor a current location of the mobile apparatus.

20. The head mount display device according to claim 1, wherein the AR image includes at least one of a virtual obstacle that is in a movement path of the mobile apparatus or a graphical representation of a prohibited area that is in the movement path of the mobile apparatus.

21. A head mount display device, comprising:
a memory configured to store a plurality of images of at least one object located at a first geospatial location of a mobile apparatus in a real space; and
circuitry configured to:
detect a posture of a user's head;
receive a first image from the mobile apparatus;
control, based on the posture of the user's head, a display unit to display the first image;
recognize the at least one object in the first image based on the stored plurality of images of the at least one object; and
control, based on the recognition, the display unit to display a second image such that an Augmented Reality (AR) image corresponding to the at least one object is superimposed on the first image.

\* \* \* \* \*